(12) United States Patent
Hoshino et al.

(10) Patent No.: US 7,245,293 B2
(45) Date of Patent: Jul. 17, 2007

(54) DISPLAY UNIT WITH TOUCH PANEL AND INFORMATION PROCESSING METHOD

(75) Inventors: Takeshi Hoshino, Kodaira (JP); Takeshi Minemoto, Kawasaki (JP); Yujin Tsukada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/190,849

(22) Filed: Jul. 28, 2005

(65) Prior Publication Data

US 2005/0259087 A1 Nov. 24, 2005

Related U.S. Application Data

(63) Continuation of application No. 10/230,100, filed on Aug. 29, 2002, now Pat. No. 6,940,494.

(30) Foreign Application Priority Data

Aug. 2, 2002 (JP) .............................. 2002-226131

(51) Int. Cl.
*G09G 5/08* (2006.01)
(52) U.S. Cl. ..................... 345/173; 345/87; 345/177; 345/179; 178/18.01; 178/19.01; 178/19.04
(58) Field of Classification Search ................ 345/87, 345/173, 177, 179, 182; 178/18.01, 18.06, 178/19.01, 19.02, 19.03, 19.04
See application file for complete search history.

(56) References Cited

U.S. PATENT DOCUMENTS 5,008,497 A * 4/1991 Asher ...................... 178/18.05
5,060,527 A * 10/1991 Burgess .................... 73/862.68
5,159,159 A * 10/1992 Asher ...................... 178/18.05
6,219,038 B1 * 4/2001 Cho ............................ 345/173
6,335,722 B1 * 1/2002 Tani et al. ................... 345/173
6,459,424 B1 * 10/2002 Resman ....................... 345/173
6,628,271 B1 9/2003 Matsumoto et al.
2002/0008691 A1 * 1/2002 Hanajima et al. ........... 345/173
2002/0033920 A1 * 3/2002 Sun ............................. 349/139

FOREIGN PATENT DOCUMENTS

| JP | 5-216587 | 8/1993 |
|---|---|---|
| JP | 8-221202 | 8/1996 |
| JP | 10-154042 | 6/1998 |
| JP | 10-171600 | 6/1998 |
| JP | 11-203044 | 7/1999 |
| JP | 11-355617 | 12/1999 |

* cited by examiner

*Primary Examiner*—Bipin Shalwala
*Assistant Examiner*—Vincent E. Kovalick
(74) *Attorney, Agent, or Firm*—Mattingly, Stanger, Malur & Brundidge, PC

(57) ABSTRACT

A display unit with a touch panel to move a touch-driven member such as a functional button to a desired position through a touch operation. By touching a draggable icon displayed on a screen with a finger, the icon is changed in color to indicate that the user can drag the icon. Then, by pushing the icon, the icon is changed in size and color to indicate that the user can drag the icon. As by reducing the pushing force to touch on the icon, and moving the finger, the icon is dragged following the finger. As by pushing the icon with the finger at a predetermined position, the icon is set at this position and changed in size and color. When releasing the finger from the icon, the icon is settled at this position.

3 Claims, 16 Drawing Sheets

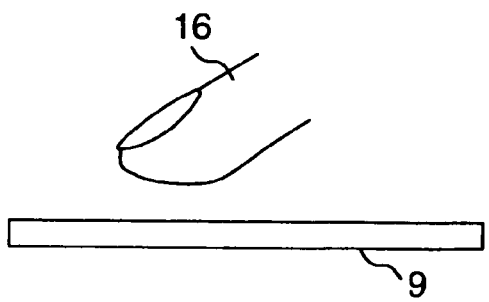
FIG. 3A
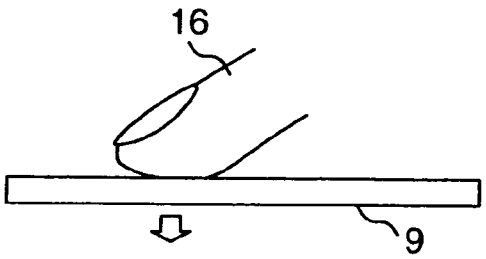
FIG. 3B
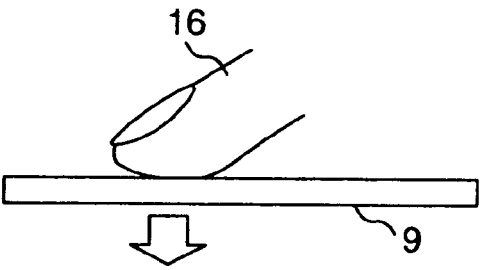
FIG. 3C
FIG. 4
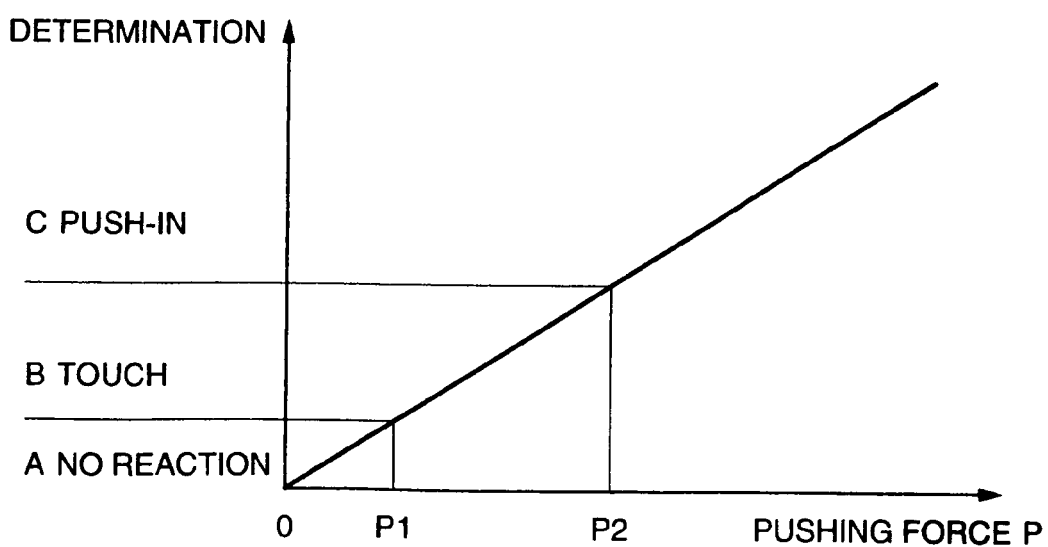

FIG. 6A

|     | x1   | x2   | · xi · | xn   |
|-----|------|------|--------|------|
| y1  | -    | obj1 | obj3   | -    |
| y2  | -    | obj1 | obj3   | -    |
| . yj . | obj2 | obj2 | obj4 | -    |
| ym  | -    | -    | obj5   | -    |

FIG. 6B

|     | x1   | x2   | · xi · | xn   |
|-----|------|------|--------|------|
| y1  | are1 | -    | are3   | -    |
| y2  | are1 | -    | are3   | -    |
| . yj . | are2 | are2 | are4 | are5 |
| ym  | -    | -    | -      | -    |

DISPLAY UNIT WITH TOUCH PANEL AND INFORMATION PROCESSING METHOD

This is a continuation application of U.S. Ser. No. 10/230,100, filed Aug. 29, 2002 now U.S. Pat. No. 6,940,494.

BACKGROUND OF THE INVENTION

The present invention relates to a display unit with a touch panel which is used in a terminal device such as a desk top type, a portable device and the like.

In recent years, terminal devices have been used more and more widely in a variety of businesses. For example, automatic teller machines (ATM) have been installed in banks and the like, while automatic ticket vending machines and map guiding machines have been installed in stations and the like, so that some of businesses involved in the banks, stations and the like can also be processed on the terminal devices. In addition, establishments such as fast food restaurants also employ terminal devices for processing orders of articles made by customers (for example, see JP-A-5-216587). Moreover, there have been practiced or proposed a terminal device for receiving delivered contents, and a terminal device for browsing web sites utilizing a communication network such as the Internet.

Such a terminal device as mentioned above is provided with a display unit which displays information such as a message presented on its display screen, so that a user operates an input means such as a keyboard, while viewing the information, to proceed with a variety of operations as mentioned. There has been a growing trend to employ a display device with a touch panel on a display screen, which has functions of input means, permitting the user to make operations on the screen in accordance with messages, menus and the like displayed thereon to execute a variety of operations.

Such a display unit with a touch panel allows the user to directly touch his finger tip on the display screen for operations, thereby providing a high operability which includes easy operations and less errors in operations. In addition, since the number of functional buttons can be reduced in an input unit such as a keyboard, the terminal device itself can be reduced in size, resulting in advantages such as a reduction in the area required for installation, a higher degree of freedom for a place at which the terminal device is installed in a store, a precinct, or the like.

A conventional display unit with a touch panel, however, displays an image representative of an input device comprised of touch-driven members such as functional buttons (touch buttons) on its display screen such that a customer or user visually recognizes the input device, and under this recognition touches a desired position on the image representative of the input device, causing the display device to execute predetermined processing associated with the touched position.

A personal computer is provided with a mouse-based drag-and-drop function. Since the user can freely move the cursor through the mouse and push a click button (buttons), the user can move an icon with the click button held down, or place the cursor on an icon and double clicks the click button to instruct the personal computer to execute a preset function associated with the icon.

However, since the conventional touch panel, by sensing one touch at a time, executes each process only one process can be executed. For example, with a display unit with a touch panel, typically employed in ATM and the like, as the user touches a touch-driven member on a display screen, a function associated with the touch-driven member is activated at this time, so that the user cannot perform the drag-and-drop function through a touch operation. While some compact information devices with a touch panel provide the drag-and-drop function, these devices require the user to touch an icon twice at preset timings in order to activate a function previously associated with the icon. With operations on a mouse, the user indirectly operates the mouse while viewing the cursor displayed on the display screen, so that no serious problems arise in the visibility and operability. On the contrary, a touch panel, which forces the user to directly handle a touch-driven member displayed on a display screen, implies challenges in the prevention of erroneous operations and the operability because the user must touch a position once touched by him again at the same timing. Particularly, when public devices are concerned, such as ATM, automatic machines, and the like which can be operated by indefinite users, a problem still remains in forcing every user to touch a position twice at the same timing.

SUMMARY OF THE INVENTION

To solve the problem mentioned above, it is an object of the present invention to provide a display unit with a touch panel which is capable of arbitrarily moving a touch-driven member such as a functional button to a position desired by a user, and is capable of activating a function previously set to each touch-driven member.

To achieve the above object, the present invention provides a display unit with a touch panel which is capable of detecting a pushing force applied to a touch-driven member displayed on a display surface of the display panel in two stages, wherein the touch-driven member is made movable on the display screen in response to a first pushing condition, and a function associated with the touch-driven member is made executable in response to a second pushing condition.

Specifically, a representative means according to the present invention includes sensing means for sensing a pushing force P produced by indicating means when the indicating means touches the touch-driven member, and a control unit for performing first processing associated with the touch-driven member pushed by the indicating means when the pushing force P detected by the sensing means is equal to or larger than a first set pressure P1 and smaller than a second set pressure P2 larger than the first set pressure P1 (P1<=P<P2), and for performing second processing associated with the touch-driven member pushed by the indicating means when the pushing force P is equal to or larger than the second set pressure P2 (P2<=P), wherein the first processing includes dragging the touch-driven member following the indicating means pursuant to a movement of the indicating means, and the second processing includes activating a function previously assigned to the touch-driven member.

Other objects, features and advantages of the invention will become apparent from the following description of the embodiments of the invention taken in conjunction with the accompanying drawings.

BRIEF DESCRIPTION OF THE DRAWINGS

FIGS. 3A to 3C are diagrams illustrating how an operator touches a finger tip on a touch panel in FIG. 1;

FIG. 4 is a graph showing how to determine from a pressure detected by a pressure sensor whether the finger tip illustrated in FIG. 3 is pushing the touch panel in, or is in touch with the touch panel, or is released from the touch panel;

FIGS. 6A and 6B are tables schematically showing specific examples of databases in a storage unit in FIG. 5;

DETAILED DESCRIPTION OF THE EMBODIMENTS

In the following, the present invention will be described in connection with several embodiments thereof with reference to the accompanying drawings.

Figure 1A:
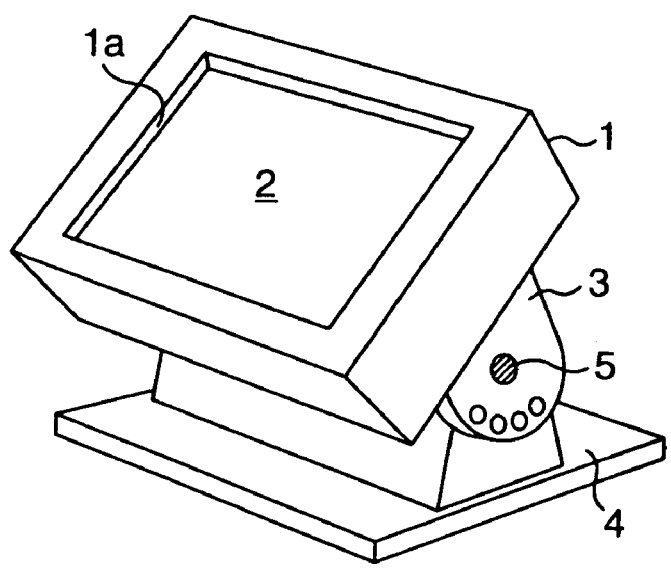
FIGS. 1A to 1C are diagrams showing one embodiment of a display unit with a touch panel according to the present invention.
Figure 1B:
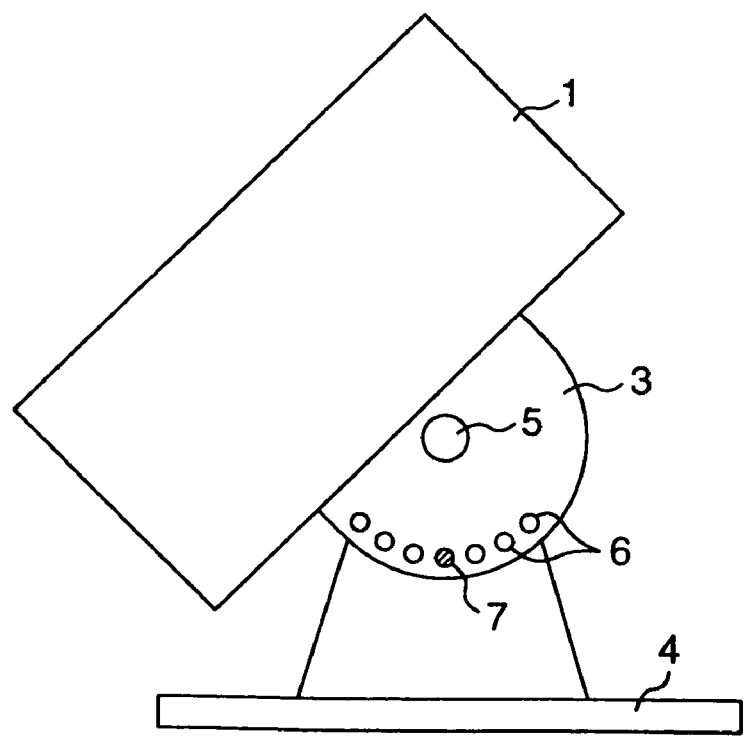
Figure 1C:
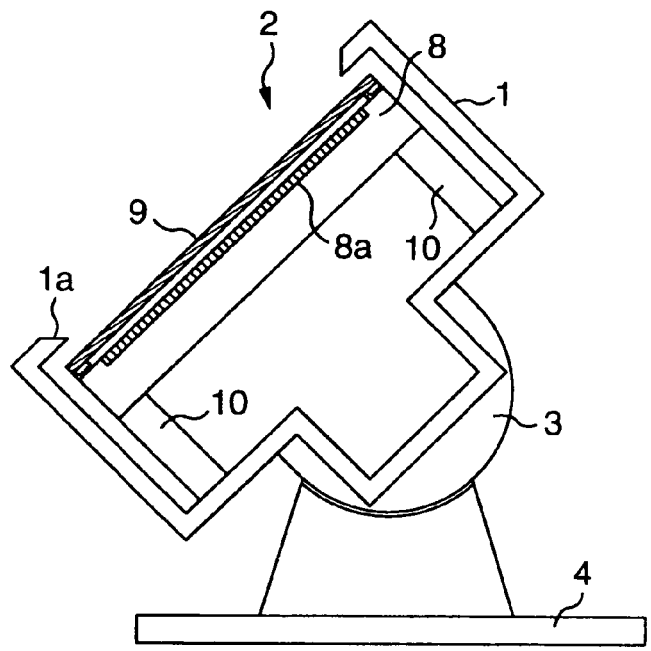

FIGS. 1A to 1C are diagrams showing one embodiment of a display unit with a touch panel according to the present invention, and FIG. 1A is a perspective view, FIG. 1B is a side view, and FIG. 1C is a cross-sectional view. The display unit comprises a housing 1; an opening 1a; display screen 2; a mount 3; a stand 4; a rotating shaft 5; pin holes 6; a pin 7; a display panel 8; a display surface 8a; a touch panel 9; and a supporting member 10.

As can be seen in FIG. 1A, the box-shaped housing 1 is formed with a rectangular opening 1a through a front face thereof, and the display screen 2 is fitted in the opening 1a. Though not shown, displayed on the display screen 2 are members and areas for activating functions assigned to touch-driven members such as functional buttons and messages (hereinafter collectively called the "touch-driven members"). As a user touches such a touch-driven member with a finger tip, the nib of a pen, or an instructing means such as a pen-shaped input device, the user can operate a device which incorporates the display unit according to this embodiment (for example, a personal computer, portable terminal, ATM, ticket vending machine, and the like).

The mount 3 is integrally formed on the back of the housing 1, opposite to the opening 1a. The mount 3 is mounted to the stand 4 through the rotating shaft 5. With the mount 3, the housing 1 is rotatable about the rotating shaft 5 with respect to the stand 4, so that the display screen 2 can be changed in orientation by rotating the housing 1.

While the display screen 2 may be continuously changed in orientation, the display screen 2 in this embodiment is designed to permit a gradual change in orientation. For this purpose, the mount 3 is formed with a plurality of pin holes 6 on a side face arranged about the rotating shaft 5, and the pin 7 is provided opposite to one point on a line along which the pin holes 6 are arranged, as illustrated in FIG. 1B, such that the pin 7 can be pushed into the stand 4 through one of the pin holes 6. As the housing 1 is rotated about the rotating shaft 5 to place the display screen 2 in a predetermined orientation, the pin 7 can be fitted into a nearby pin hole 6 to fix the display screen 2 substantially in this predetermined orientation.

In this manner, the pin holes 6 and pin 7 implement a means for adjusting the orientation (angle) of the display screen 2, so that the orientation of the display screen 2 can be changed in as many stages as the number of pin holes 6.

As illustrated in FIG. 1C, the display panel 8 as a display means is supported by the supporting member 10 and incorporated in the housing 1. The display surface 8a of the display panel 8 for displaying an image is fitted in the opening 1a of the housing 1, as the display screen 2, together with the touch panel 9 which covers the entirety of the display surface 8a.

Figure 2A:
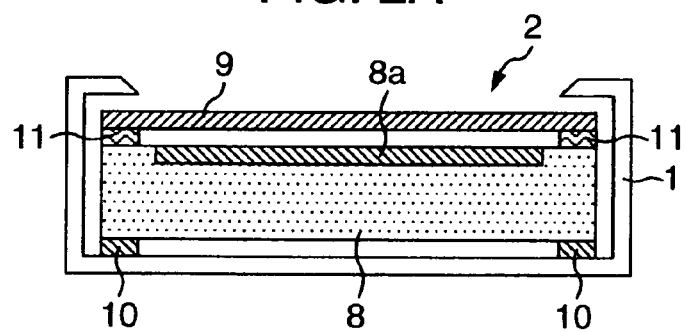
FIGS. 2A and 2B are diagrams generally illustrating a specific example of a display means within a housing in FIG. 1.
Figure 2B:
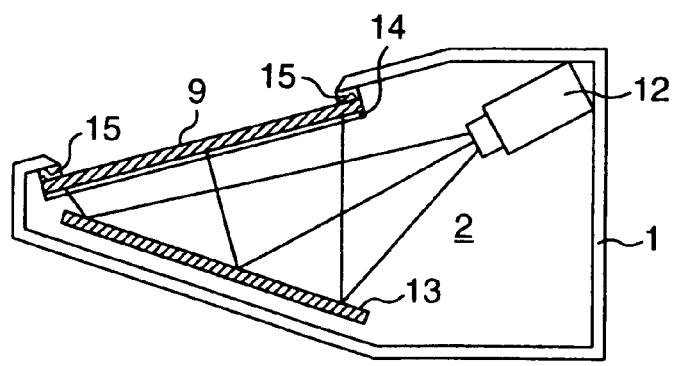

FIGS. 2A and 2B are diagrams generally illustrating specific examples of the display means contained in the housing 1 in FIGS. 1A to 1C. Specifically, FIG. 2A illustrates a display means which may be used when the display panel 8 is implemented by a liquid crystal panel, a Braun tube, a plasma display panel, or the like, while FIG. 2B illustrates a display means which may be used together with a projector such as a liquid crystal projector. The display means comprises a supporting member 11; a projection unit 12; a mirror 13; a screen 14; and a supporting member 15.

Components corresponding to those in FIGS. 1A to 1C are designated the same reference numerals, and repetitive description thereon is omitted.

In FIG. 2A, the display panel 8 is supported by the supporting means 11 in the housing 1 as described above, while the touch panel 9 is supported on the display panel 8 by the supporting means 11.

The touch panel 9 comprises a transparent film that covers the entire display surface 8a, and senses a touch thereon by the user with a finger tip (touch sensing) to detect the touched position (position detection). In this specific example, the touch panel 9 further comprises a function of detecting a pressure when the user touches the touch panel 9 (pressure detecting function). This function of detecting a pressure may be implemented by three methods as shown in the following Table 1.

TABLE 1

|  | Example 1 | Example 2 | Example 3 |
|---|---|---|---|
| Touch panel 9 | Touch Sensing Position Detection Pressure Detection | Touch Sensing Position Detection | Touch Sensing Position Detection |
| Supporting Member 10 | (Support) | Pressure Detection | (Support) |
| Supporting Member 11 | (Support) | (Support) | Pressure Detection |

In Table 1, Example 1 provides the touch panel 9 with the function of sensing a touch, and associated functions of detecting a touched position and detecting a pressure at the touched position, wherein the supporting members 10, 11 only have their inherent functions of supporting the display panel 8, and supporting the touch panel 9, respectively. In Example 2, the supporting member 10 for supporting the display panel 8 is provided with a pressure sensor to have the function of detecting a pressure, while the touch panel 9 and supporting member 11 only have their inherent functions. In Example 3, the supporting member 11 for supporting the touch panel 9 is provided with a pressure sensor to have the function of detecting a pressure, while the touch panel 9 and supporting member 10 only have their inherent functions.

In the specific example illustrated in FIG. 2B, the housing 1 contains a projector which is composed of the projection unit 12 including a liquid crystal panel, a Braun tube, or the like for generating a video image, the mirror 13, and the screen 14, and the touch panel 9 is disposed outside of and integral with the screen 14. The screen 14 and touch panel 9 are supported in the opening 1a of the housing 1 by the supporting member 15.

The projection unit 12 comprises a projecting lens, not shown, to project a video image from the projection unit 12 onto the screen 14 through the mirror 13, wherein the video image projected onto the screen 14 is enlarged by the projecting lens. The mirror 13 may be removed when the projection unit 12 is arranged to directly oppose the screen 14.

Likewise, in this specific example, the touch panel 9 is provided with a function of detecting a pressure produced when the user touches the touch panel 9 (pressure detecting function). This function of detecting a pressure may be implemented by two methods as shown in the following Table 2.

TABLE 2

|  | Example 4 | Example 5 |
|---|---|---|
| Touch panel 9 | Touch Sensing Position Detection Pressure Detection | Touch Sensing Position Detection |
| Supporting Member 15 | (Support) | Pressure Detection |

In Table 2, Example 4 provides the touch panel 9 with the function of sensing a touch, and associated functions of detecting a touched position and detecting a pressure at the touched position, whereas the supporting member 15 only has its inherent function of supporting the display panel 8. In Example 5, the supporting member 15 is provided with a pressure sensor to have the function of detecting a pressure, whereas the touch panel 9 only has its inherent function.

In the foregoing Tables 1, 2, "touch sensing" refers to a conventional function of a touch panel for sensing a finger tip 16 which gets into touch with the touch panel 9.

Alternatively, in either of the foregoing examples, the touch panel 9 may determine that the finger tip 16 gets into touch with the touch panel 9 when a position touched by the finger tip 16 is detected on the touch panel 9 (i.e., when P>=P1).

FIGS. 3A to 3C are diagrams illustrating how the user touches a finger tip 16 on the touch panel 9, wherein FIG. 3A illustrates that the finger tip 16 is not in touch with the touch panel 9; and FIGS. 3B and 3C respectively illustrate that the finger tip 16 is in touch with the touch panel 9. More specifically, FIG. 3B illustrates that the finger tip 16 is lightly in touch with the touch panel 9, while FIG. 3C illustrates that the finger tip 16 is strongly pushing the touch panel 9 in.

FIG. 4 is a graph showing how to determine from a pressure detected by a pressure sensor whether the finger tip illustrated in FIG. 3 is pushing the touch panel in, or is in touch with the touch panel, or is released from the touch panel (this determination is made by a control unit, later described), wherein the horizontal axis represents a pressure P acting on the touch panel 9 (a force pushing the touch panel 9, hereinafter called the "pushing force"), and the vertical axis represents the result of determination on the pushing force P.

In FIG. 4, a low pressure P1 and a high pressure P2 have been previously set, such that the control unit determines that no pushing force P is acting on the touch panel 9 (without reaction) when the pushing force P onto the touch panel 9 is lower than P1 (P<P1); that the finger tip 16 gets into touch with the touch panel 9 when the pushing force P is equal to or larger than P1 and smaller than P2 (P1<=P<P2) (corresponding to the "touch sensing" in the aforementioned Tables 1, 2) to detect the position on the touch panel 9 at which the finger tip 16 is in touch with the touch panel 9; and that the finger tip 16 is pushing the touch panel 9 in when the pushing force P is equal to or higher than P2 (P2<=P) because a strong pushing force is acting on the touch panel 9 to push the same in (corresponding to the "pressure detection" in the aforementioned Tables 1, 2).

FIG. 3A shows P<P1 in FIG. 4, in which case the control unit determines that no finger tip is in touch with the touch panel 9. FIG. 3B shows that the finger tip 16 is in touch with the touch panel 9, in which case the control unit determines that the finger tip 16 is not in touch with the touch panel 9 when 0<=P<P1, and that the finger tip 16 is only in touch with the touch panel 9 but not pushing the touch panel 9 in when P1<=P<P2. In this manner, erroneous operations can be reduced.

FIG. 3C shows that the user touches the touch panel 9 with the finger tip 16 to push the touch panel 9 in, so that FIG. 3C corresponds to P2<=P in FIG. 4. In this event, the control unit determines that the touch panel 9 is pushed in.

As described above, this embodiment enables the sensing of a touch on the touch panel 9 in two stages. This two-stage sensing mode can offer the user an operation feeling close to the operability provided by a keyboard. For example, the user can feel as if he is typing on a keyboard in such a manner that the user recognizes the position of a key with a lighter touch (P1<=P<P2) and strongly pushes the key in (P2<=P). Therefore, this two-stage sensing mode can provide the user with a secure typing feeling which cannot so far been achieved by conventional touch panels. Thus, according to the display unit of this embodiment which employs the two-stage sensing mode, the user can instruct an associated device to activate a particular function by touching a position on the display screen corresponding thereto, as well as perform a function similar to the drag-and drop, as described later, through a touch operation. Moreover, according to the display unit of this embodiment, "activation of a particular function" can be distinguished from a "drag-and-drop" operation based on a pressure with which the user touches the touch panel, without requiring the user to once release the finger tip from the touch panel. This can reduce possible erroneous operations, in comparison with a touch panel which activates similar functions relying on the timing of touch, as previously described in the prior art example, thus providing a satisfactory typing feeling.

While this embodiment is described in connection with a touch panel which is touched by a finger tip, taken as an example, the display unit with a touch panel according to the present invention can be operated with a rod-shaped member such as a pen, a pen-shaped input device, and the like, other than the finger tip.

It should be noted that the aforementioned pressure P1 (>0) is set to prevent an erroneous determination that the touch panel 9 is touched when the touch panel 9 is applied with an improper pressure caused, for example, by vibrations or the like.

Figure 5A:
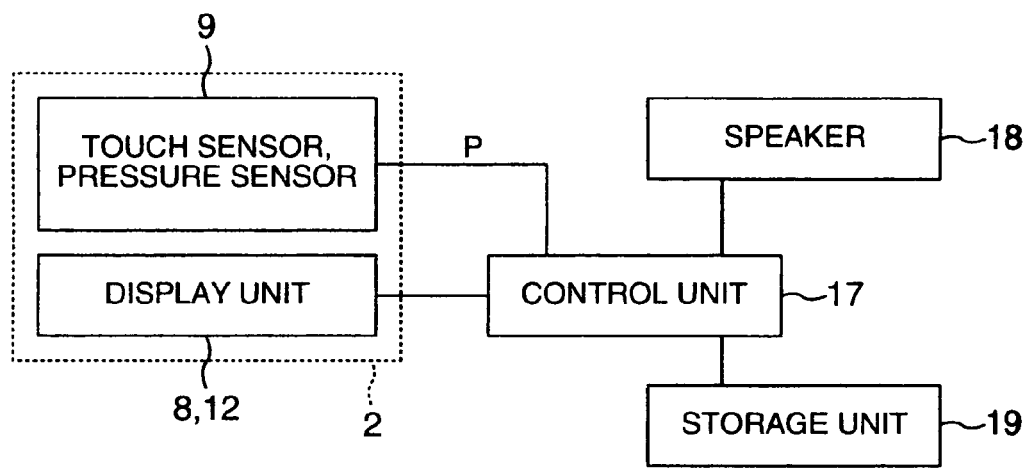
FIGS. 5A and 5B are block diagrams illustrating exemplary specific circuit configurations of a main portion in the embodiment illustrated in FIG. 1.
Figure 5B:
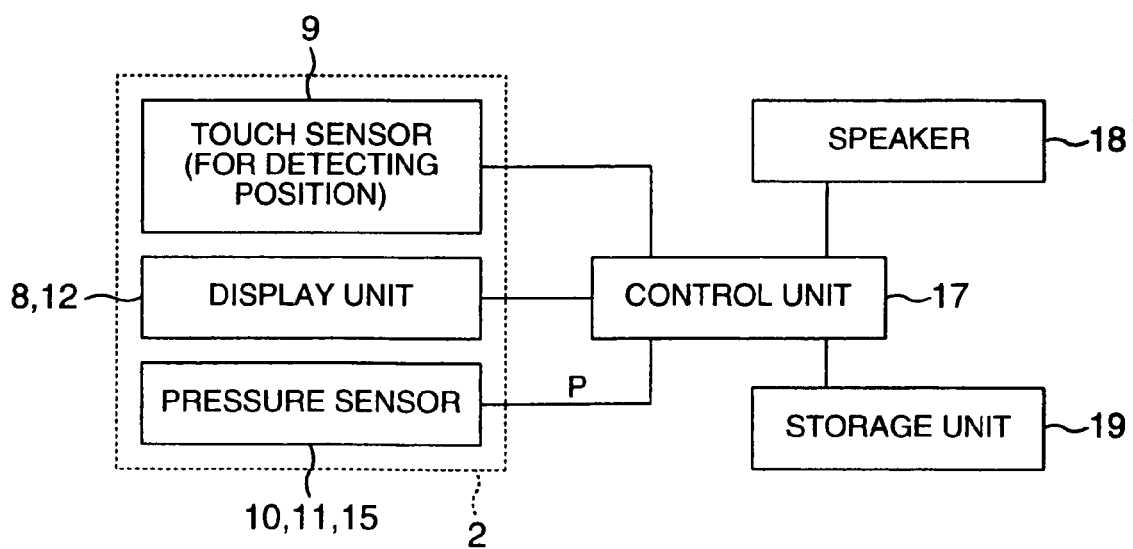

FIGS. 5A and 5B are block diagrams illustrating exemplary specific circuit configurations of a main portion in the embodiment illustrated in FIG. 1. Specifically, FIG. 5A illustrates the circuit configuration corresponding to Examples 1, 4 in the aforementioned Tables 1, 2, while FIG. 5B illustrates the circuit configuration corresponding to Examples 2, 3, 5 in Tables 1, 2. In these figures, the display panel comprises the control unit 17; a speaker 18; and a storage unit 19. Components corresponding to those in FIGS. 1 and 2 are designated the same reference numerals, and repetitive description thereon is omitted.

In the circuit configuration illustrated in FIG. 5A, the touch panel 9 comprises a touch sensor and a pressure sensor. A pressure detected P by the pressure sensor is supplied to the control unit 17. The control unit 17 makes the determination described in connection with FIG. 4 based on the detected pressure P, and controls the display panel 8 and projection unit 12, as described later, in accordance with the result of the determination and based on data stored in the storage unit 19, and reproduces a predetermined voice through the speaker 18.

Likewise, in the circuit configuration illustrated in FIG. 5B, the control unit 17 performs a similar function control in accordance with a pressure P detected by pressure sensors provided in the supporting members 10, 11, 15.

Next, the control unit 17 will be described in connection with its operation based on the pressure P. As shown in FIG. 4, assume in the following description that the processing performed by the control unit 17 is designated "A" when the pressure P satisfies 0<=P<P1; the processing performed by the control unit 17 is designated "B" when P1<=P<P2; and the processing performed by the control unit 17 is designated "C" when P2<=P. Though the respective processing will be described later in detail, the processing A is performed when the touch panel 9 is free of a touch, as the matter of course.

Now, the storage unit 19 shown in FIGS. 5A and 5B will be described with reference to FIGS. 6A and 6B.

The display unit 8 or 12 displays on the display screen 2 such touch-driven members as icons, functional buttons, and the like. The storage unit 19 stores data for determining whether or not a position at which the control unit 17 detects a touch by a finger tip 16 (FIG. 3) falls within the area of a touch-driven member, data for determining a function for each touch-driven member, and the like.

FIG. 6A shows a specific example of a database which indicates data for determining whether or not a position detected as touched by a finger tip 16 falls within the area of a touch-driven member, wherein a position on the touch panel 9 is represented by coordinates (xi, yi, where i, j=1, 2, . . . ), and respective touch-driven members are represented by objects 1, 2, 3, . . . . This specific example shows that the object 3 is placed at positions (xi, y1), (xi, y2), . . . on the touch panel 9. An object extends over a plurality of coordinate positions because the object has a certain area, for example, as an icon. In this event, data related to the object in this database may be, for example, ID (identification code) uniquely assigned to this object.

The database shown in FIG. 6A shows the relationship between positions on the touch panel 9 and objects. The storage unit 19 further stores a database which represents functions associated with the respective objects (hereinafter called the "function database"), though not shown.

As the control unit 17 detects a position at which the finger tip 16 touches the touch panel 9 in the manner described above, the control unit 17 compares the touched position with data in the database shown in FIG. 6A to determine whether or not the touched position falls within the area of an object, and to determine in the area of which object the touched position is included, if within the area of an object. Assuming that the touched position is included in the area of the object 3, the control unit 17 determines that the user is now touching the object 3, reads the function data in accordance with a pressure P detected on the object 3 from the function database, and controls the display unit 8, 12 (FIG. 5) in accordance with the read function data.

FIG. 6B in turn shows a database which relates the areas of touch-driven members (objects) on the touch panel 9 to positions (xi, yj) on the touch panel 9, wherein the areas of the touch-driven members are represented by areas (are) 1, 2, 3, . . . . The database shown in FIG. 6B is similar to that shown in FIG. 6A except for the foregoing.

The following description will be centered on a specific example of the function control performed by the control unit 17, wherein the display unit of the present invention is provided with a function of dragging and dropping an object such as an icon displayed on the display screen 2.

Figure 7:
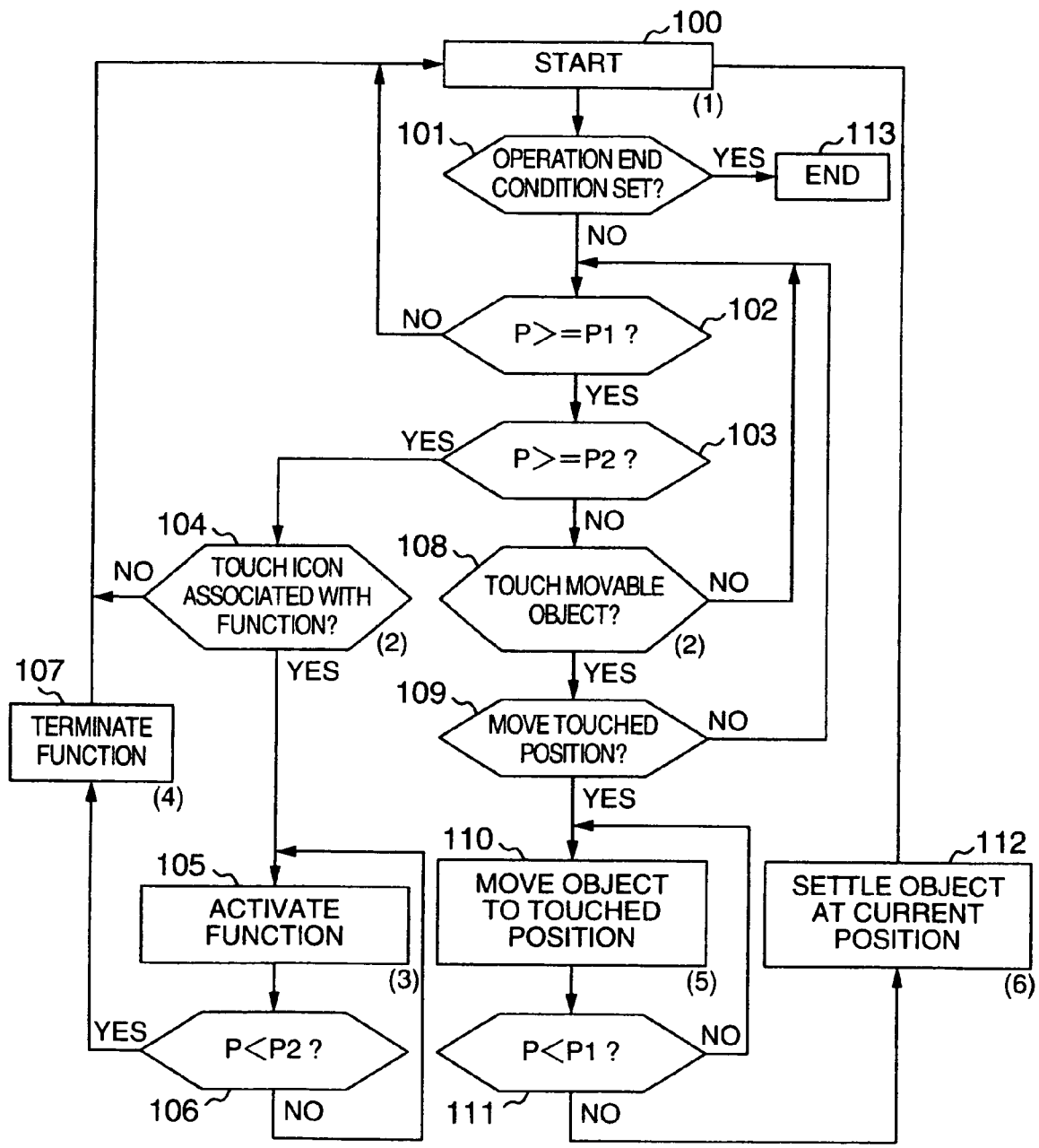
FIG. 7 is a flow chart illustrating a first specific example of a function control performed by a control unit in FIG. 5.
Figure 8:
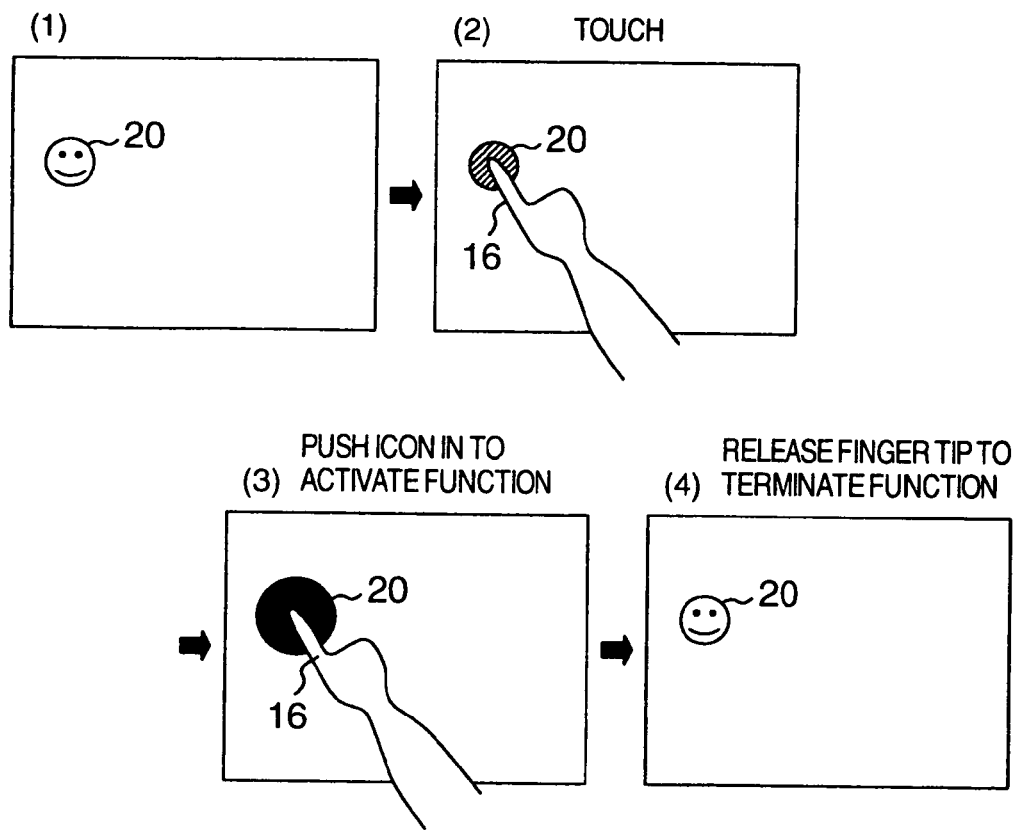
FIG. 8 is a diagram illustrating a first specific example of images displayed on a display screen in FIG. 1 in the process of a control operation illustrated in FIG. 7.
Figure 9:
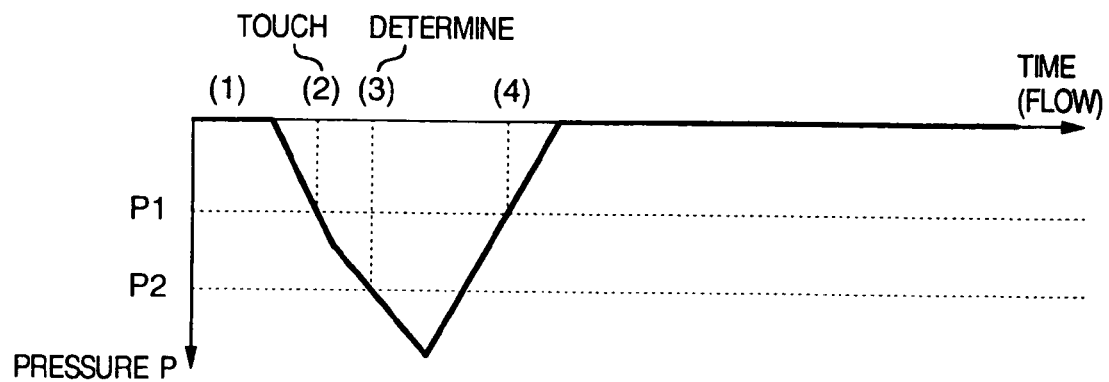
FIG. 9 is a diagram showing a first specific example of a change in pressure produced by a finger tip for executing the control operation illustrated in FIG. 7.
Figure 10:
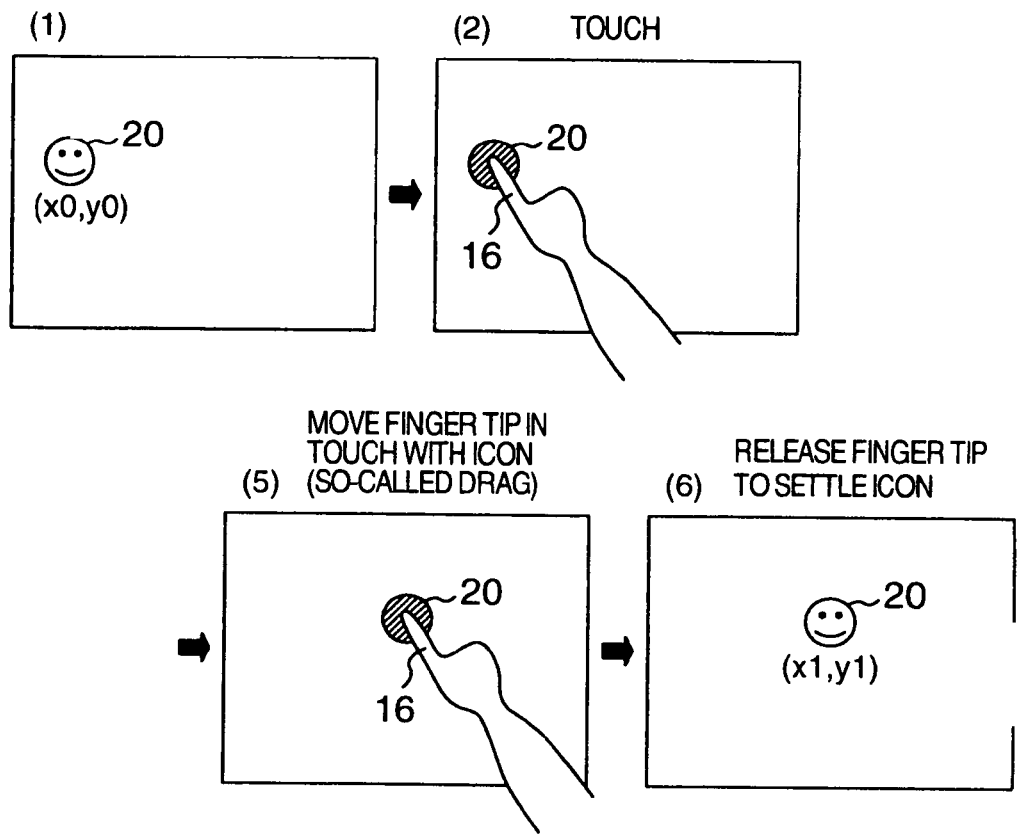
FIG. 10 is a diagram illustrating a second specific example of images displayed on a display screen in FIG. 1 in the process of the control operation illustrated in FIG. 7.
Figure 11:
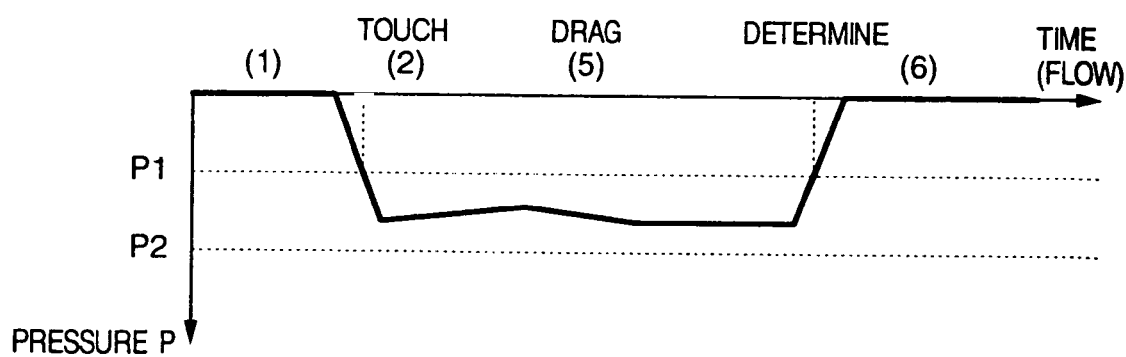
FIG. 11 is a diagram showing a second specific example of a change in pressure produced by a finger tip for executing the control operation illustrated in FIG. 7.

FIG. 7 is a flow chart illustrating a first concrete example of the function control performed by the control unit 17. FIG. 8 includes diagrams for illustrating a specific example of images displayed on the display screen 2 while the control unit 17 is executing the function control, wherein an object 20 is illustrated as an icon, though the object is not limited thereto. FIG. 9 is a graph showing a change in the pressure P for performing an operation associated with the icon 20 in FIG. 8 in the process of the function control. FIG. 10 includes diagrams for illustrating another specific example of images displayed on the display screen 2 while the control unit 17 is executing the function control, wherein parts corresponding to those in FIG. 8 are designated the same reference numerals. FIG. 11 is a graph showing a change in the pressure P for performing an operation associated with the icon 20 in FIG. 10 in the process of the function control.

Referring first to FIG. 7, as a power supply, not shown, is turned on, the control unit 17 performs the processing A to start operating the device (step 100). Then, the control unit 17 determines whether or not an operation end condition is set by turning off the power supply or the like (step 101). If no operation end condition is set, the control unit 17 acquires the pressure P detected by the pressure sensor in FIG. 5 and determines whether or not P is equal to or higher than P1 (P>=P1) (step 102). When the pushing force P is smaller than P1 (P<P1) in the state as illustrated in FIG. 3A, the flow returns to step 100 on the assumption that no touch operation is performed on the touch panel 9, followed by repetitions of a sequence of operations at steps 100–102, until the user touches the touch panel 9. In the meantime, the control unit 17 performs the processing A. An image displayed on the display screen 2 (FIG. 1) at this time is shown in image (1) in FIGS. 8 and 10. For facilitating the description, a single icon 20 is displayed on the respective images (1).

Now, when the user instantaneously touches the touch panel 9 with a finger tip 16 as illustrated in FIG. 3C, the touch operation on the touch panel 9 causes a change in the pressure P to P2 or higher (P>=P2), as shown in FIG. 9. The control unit 17 first determines that P>=P1 (step 102), and then determines that P>=P2 (step 103). These determinations are made instantaneously. In the following, this operation is called the "push-in operation."

The control unit 17 then detects the position at which the user touches the touch panel 9, and determines whether or not the position falls within the area of the icon 20 in which the touch operation causes the activation of a function associated with the icon 20 (step 104), as previously described in connection with FIG. 6. When the control unit 17 determines that the user touches the touch panel 9 at a position out of the icon 20 on the image (1) illustrated in FIG. 8, the flow returns to step 100, followed by repetitions of the sequence of operations at steps 100–104, as long as no change is detected on the touch panel 9. On the other hand, when the control unit 17 determines that the user touches the touch panel 9 within the area of the icon 20 on the image (1) illustrated in FIG. 8 (step 104), the control unit 17 switches the image (1) to a image (2) in FIG. 8 in which the touched icon 20 is changed in color or is being vibrated. In this event, since P>=P2, the control unit 17 merely instantaneously displays the image (2), and again switches the image (2) to a image (3) in FIG. 8, in which the touched icon 20 is again changed in color, changed in size, or is further violently vibrated. Together with this switching of the screen, the control unit 17 activates a function determined by the icon 20 (step 105). Subsequently, as the user releases the finger tip 16 from the touch panel 9 so that the pressure P becomes lower than P2 (P<P2), the control unit 17 terminates the function associated with the icon 20 (step 107), followed by the flow returning to step 100 to repeat the operations at steps 100–102. Then, a image (4) in FIG. 8 is displayed on the display screen 2 which remains in a standby state.

According to the foregoing embodiment, since the icon 20 touched by the user is changed in color or is vibrated, the user can definitely know the position on the touch panel 9 at which the user has touched. Since the icon 20 is again changed in response to the operation of the user who strongly pushes the icon 20 in, the display unit can permit the user to visually recognize the push-in operation associated with the movement of the finger. Consequently, the display unit of this embodiment can realize a touch feeling and the two-stage push-in operation, which can be achieved by a keyboard, thereby providing the user with a secure typing feeling.

The foregoing description has been made in connection with the touch operation when the pushing force P is equal to or smaller than P2 (P>=P2). When the pushing force P is equal to or larger than P1 and smaller than P2 (P2>P>=P1) (step 102, 103), the control unit 17 (FIG. 5) senses a position touched by the finger tip 16 from the output of the touch sensor, and compares the detected position with data stored in the storage unit 19 (FIG. 5) to determine whether or not the touched position falls within the area of the icon 20. When within the area of the icon 20, the control unit 17 determines whether or not the icon 20 is movable. When movable, the control unit 17 determines that the touched position is included in the area of the movable icon 20, and displays a image (2) on the display screen 2. As illustrated in FIG. 10, the image (2) indicates that the icon 20 is movable, and that the user can start a movement of the icon 20 (step 108). For indicating that the icon 20 is movable and that the user can start a movement, the icon 20 may be changed in color or vibrated. Alternatively, the icon 20 may be changed in size, and these techniques may be used in combination.

Though not shown, when the user releases the finger tip 16 from the touch panel 9 from the state described above so that the pressure P becomes smaller than P1 (P<P1), the flow returns to step 100.

As the user moves the finger tip 16 (i.e., the touched position) within the area of the icon 20 with the pushing force P equal to or larger than P1 and smaller than P2 (P1<=P<P2) (step 109), the icon 20 at the position (x0, y0) follows the movement of the finger tip 16, i.e., the icon 20 is dragged (step 110). In this event, a image (5) in FIG. 10, indicative of this movement, is displayed on the display screen 2. As illustrated in FIG. 11, as long as the finger tip 16 remains touched on the screen panel 9, i.e., as long as the pushing force P is equal to or larger than P1 (P>=P1) (step 111), the icon 20 is continuously dragged.

Subsequently, as the user releases the finger tip 16 from the touch panel 9 at a predetermined position (x1, y1) so that the pressure P becomes lower than P1 (P<P1) as illustrated in FIG. 11 (step 111), the icon 20 is settled at this position (x1, y1), and therefore the dragging operation is ended (step 112). Then, the control unit 17 displays a image (6) illustrated in FIG. 10 on the display screen 2, wherein the icon 20 is placed at this settled position as originally displayed. Subsequently, the flow returns to step 100.

In this manner, in the first concrete example, a movable object such as an icon displayed on the screen can be moved to a predetermined position through a simple touch operation. In addition, the user can of course instruct the device to activate a function associated with the object by pushing the object in with the pressure P equal to or higher than P2 (P>=P2).

Also, in this embodiment, once a dragging operation is started to move an object, the object is continuously dragged unless the user releases the finger tip from the touch panel. Therefore, even if the user applies the pressure equal to or higher than P2 on the object in the middle of the dragging operation, this change in the pushing force P will not activate a function assigned to the dragged object. As such, since the function assigned to the object will not be erroneously activated during a movement of the object, the user can perform the dragging operation without anxiety.

Thus, according to this embodiment, the control unit 17 senses a pushing force of a finger in two stages, so that the activation of a function associated with an object can be readily distinguished from a dragging operation for the object without errors.

Figure 12:
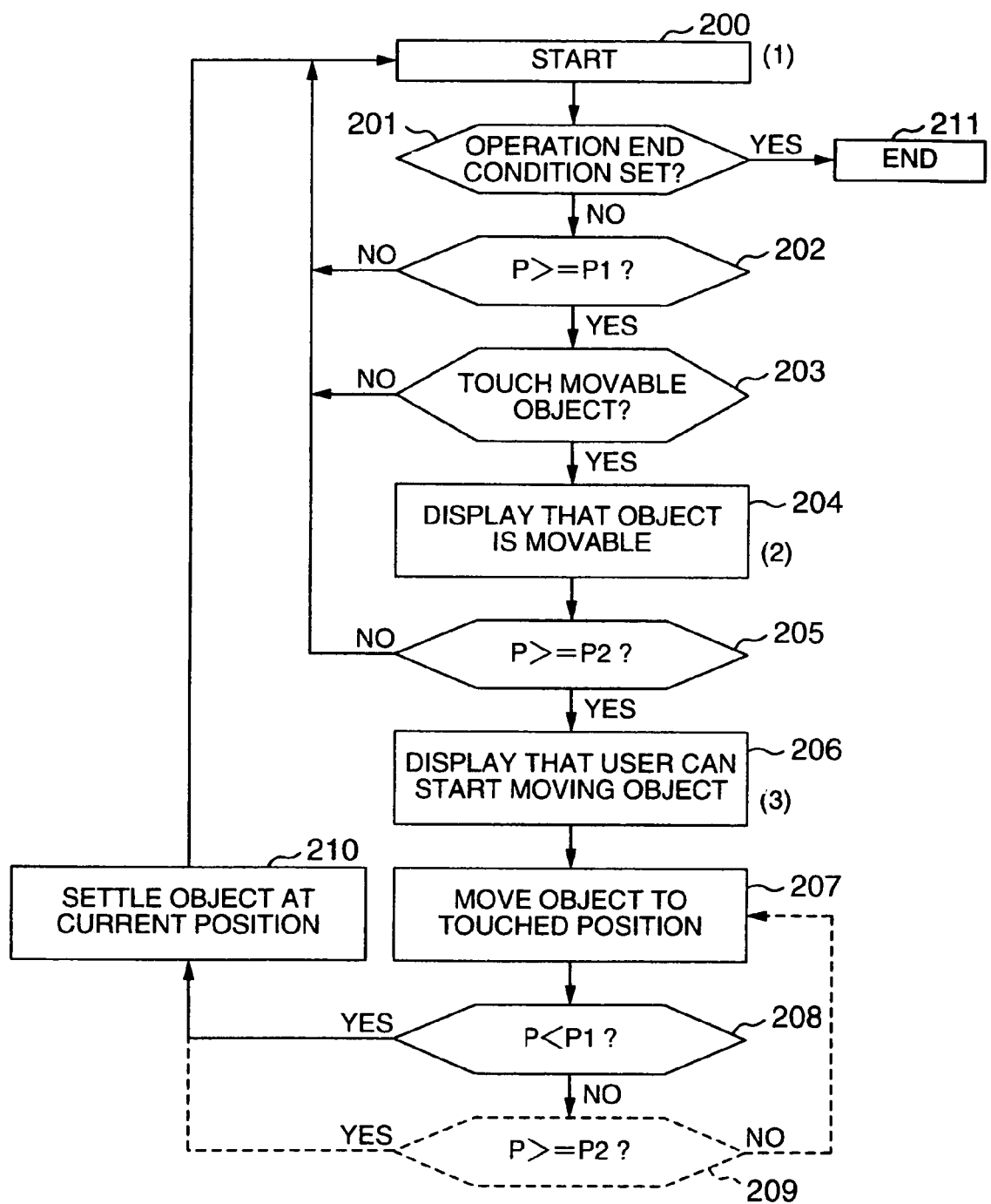
FIG. 12 is a flow chart illustrating a second specific example of the function control performed by the control unit in FIG. 5.

FIG. 12 is a flow chart illustrating a second specific example of the function control performed by the control unit 17 in FIG. 5. Like the foregoing first specific example, the function control in the second specific example also provides a function of dragging and dropping an object such as an icon displayed on the display screen 2.

Figure 13:
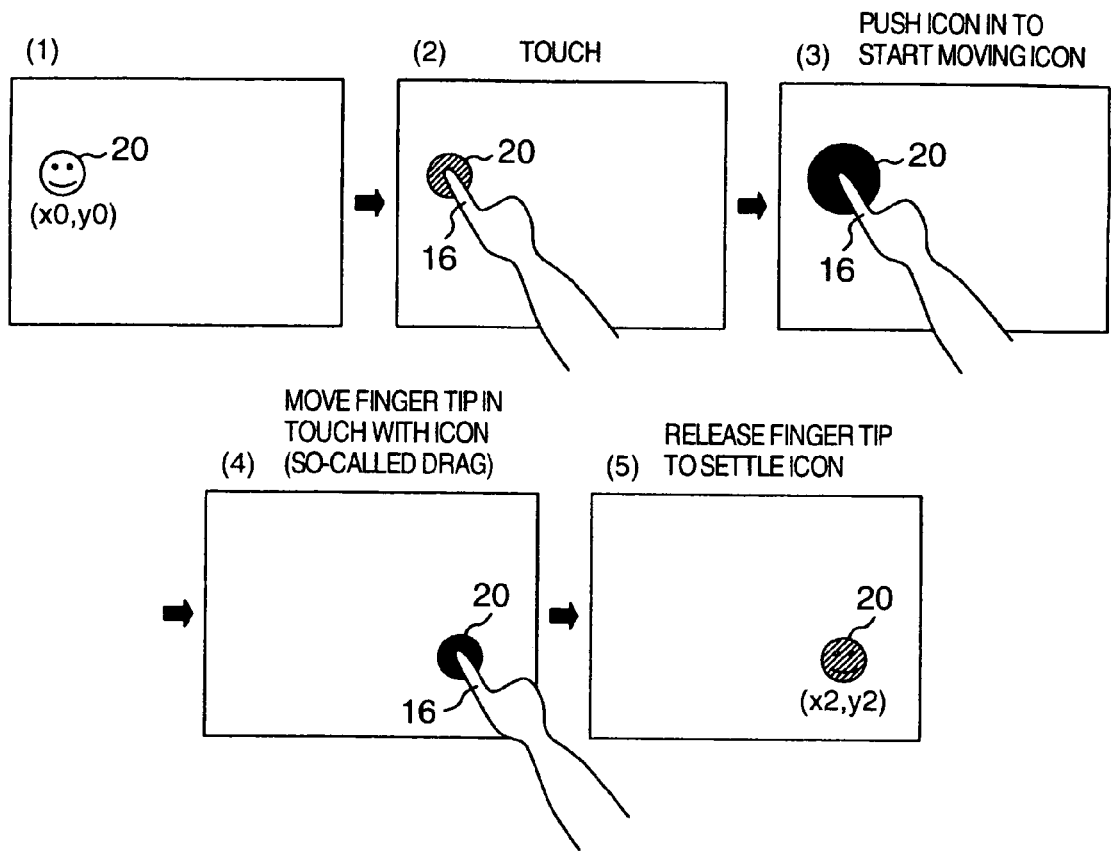
FIG. 13 is a diagram illustrating a specific example of images displayed on the display screen in FIG. 1 in the process of a control operation illustrated in FIG. 12.

FIG. 13 in turn illustrates images displayed on the display screen 2 in the process of the function control performed by the control unit 17. Parts corresponding to those in FIG. 12 are designated the same reference numerals.

Figure 14:
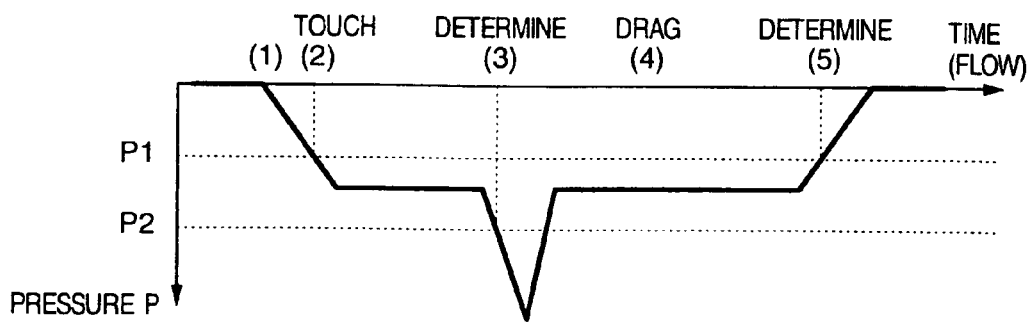
FIG. 14 is a diagram showing a specific example of a change in pressure produced by a finger tip for executing the control operation illustrated in FIG. 12.

FIG. 14 further shows a change in the pushing force P for executing the operation in the second specific example of the function control. Specifically, FIG. 14 denotes sequential numbers (1)–(5) corresponding to the images in FIG. 13 along a time axis.

Referring first to FIG. 12, steps 200–202 and 211 are similar to steps 100–102 and 113 in FIG. 7, wherein the finger tip 16 is not in touch with the touch panel 9, and a image (1) illustrated in FIG. 13 is displayed on the display screen 2. In the image (1), assume that an icon 20 is displayed at a position (x1, y1) on the display screen 2, as is the case with the aforementioned first specific example of the function control.

As the user brings the finger tip 16 into touch with the position at which the icon 20 is displayed on the image (1) appearing on the display screen 2, the pressure sensor senses a pushing force P equal to or larger than P1 (P1<=P), as shown in FIG. 14 (step 202). In response, the control unit 17 (FIG. 5) senses the position at which the finger tip 16 touches the display screen 2 from the output of the touch sensor, and compares the sensed position with data stored in the storage unit 19 (FIG. 5) to determine whether or not the position at which the screen display 2 is pushed in by the finger tip 16 falls within the area of the icon 20 (step 203). When within the area, the control unit 17 determines that the user has pushed the touch panel 9 in at the position within the area of the movable icon 20, and displays a image (2) on the display screen 2 for indicating that the icon 20 is movable, as illustrated in FIG. 13 (step 204). For indicating that the icon 20 is movable, the icon 20 may be changed, for example, in color, vibrated, or the like.

Next, as the user pushes the icon 20 in with the finger tip 16 held in touch with the icon 20 (hereinafter, the position touched by the finger tip 16 is called the "push-in position"), the pressure sensor senses the pushing force P equal to or larger than P2 (P2<=P), as shown in FIG. 14 (step 205). In response, the control unit 17 (FIG. 5) senses the touch position at which the user has pushed the icon 20 in, from the output of the touch sensor, and compares the push-in position with data stored in the storage unit 19 (FIG. 5) to determine whether or not the push-in position falls within the area of the icon 20. When within the area, the control unit 17 displays a image (3) on the display screen 2 for indicating that the user can start moving the icon 20, as illustrated in FIG. 13 (step 206). For indicating that the user can start moving the icon 20, for example, the icon 20 may be increased in size, changed in color, vibrated, and the like.

Then, the user releases the finger tip 16 from pushing the icon 20 in with the image (3) displayed on the display screen 2, reduces the pushing force P applied by the finger tip 16, and moves the finger tip 16 which is maintained on the icon 20 (in this event, P1<=P<P2, as shown in FIG. 14). In this manner, the user can move (drag) the icon 20 which follows the finger tip 16. As illustrated in FIG. 13, the control unit 17 displays a image (4) on the display screen 2, showing that the icon 20 moves following the finger tip 16 (step 207). For displaying the icon 20 in this event, for example, the icon 20 may be further changed in color, size or the like. In this embodiment, the icon 20 is returned to the original size, and is further changed in color.

In this manner, the user can continuously drag the icon 20 with the finger tip 16 as long as P1<=P<P2 is satisfied (steps 208, 209). When the user releases the finger tip 16 from the touch panel 9 so that the pushing force P is reduced to smaller than P1 (P<P1) (step 208), the icon 20 is settled (dropped) at a position (x2, y2) at which the user releases the finger tip 16, thus completing the drag-and-drop operation (step 210).

Then, the control unit 17 displays a image (5) illustrated in FIG. 13 on the display screen 2, showing that the icon 20 is settled at the position (x2, y2) as originally displayed. Subsequently, the flow returns to step 200.

As described above, in the second specific example, a movable object such as an icon displayed on the screen can be moved to a predetermined position likewise through a simple touch operation. Particularly, in this embodiment, the user cannot move the icon 20 even if the user touches the icon 20 with the pushing force P which satisfies P1<=P<P2. The user can drag the icon 20 after the user pushes the touch panel 9 in with the finger tip 16 so that the pushing force P equal to or larger than P1 and smaller than P2 (P1<=P<P2) is increased to P2 or larger (P>=P2). Therefore, even when there is a time between (2) and (3) as shown in FIG. 14, the user cannot drag the icon 20. This permits the user to operate the touch panel 9 without anxiety because touching the icon 20 will not cause the icon 20 to be inadvertently shifted. Particularly, the user first touches an intended icon 20 to confirm the selection (through a change of the icon 20), and can determine to drag the icon 20, so that this embodiment is effective for a weak-sighted operator.

It should be noted that the foregoing description on this embodiment has been centered on the drag-and-drop operation for facilitating the description. Of course, the drag-and-drop operation may be used in combination with a push-in operation for activating a function associated with the icon 20. In this event, when the pushing force P is equal to or larger than P1 (P>=P1) at step 202, it may also be determined whether or not P is equal to or larger than P2 (P>=P2). When P>=P2, an operation for activating the function may be performed in a manner similar to steps 104–107 in FIG. 7.

In this event, for avoiding a confusion with the aforementioned step 205, when the user pushes the icon 20 in for a short time to cause a transition of the pushing force P from P<P1 to P>=P2 during a standby state at steps 200–202, the control unit 17 may activate the function associated with the icon 20 without permitting the user to drag the icon 20. Alternatively, the control unit 17 may activate the function associated with the icon 20 when the user releases the finger tip 16 from the touch panel 9 in a short time after the user has pushed the icon 20 in with the pushing force P equal to or larger than P2 (P>=P2), i.e., when P>=P1. Further alternatively, each object may be associated with a function such that an operation for activating the function is accepted in a particular region on the display screen, and a dragging operation is accepted in the remaining region.

Also, in FIG. 12, when the user pushes the icon 20 in with the finger tip 16 (P>=P2) while the user is dragging the icon 20, the icon 20 may be settled at a position (x2, y2) at which the user pushes the icon 20 in (step 209).

Figure 15:
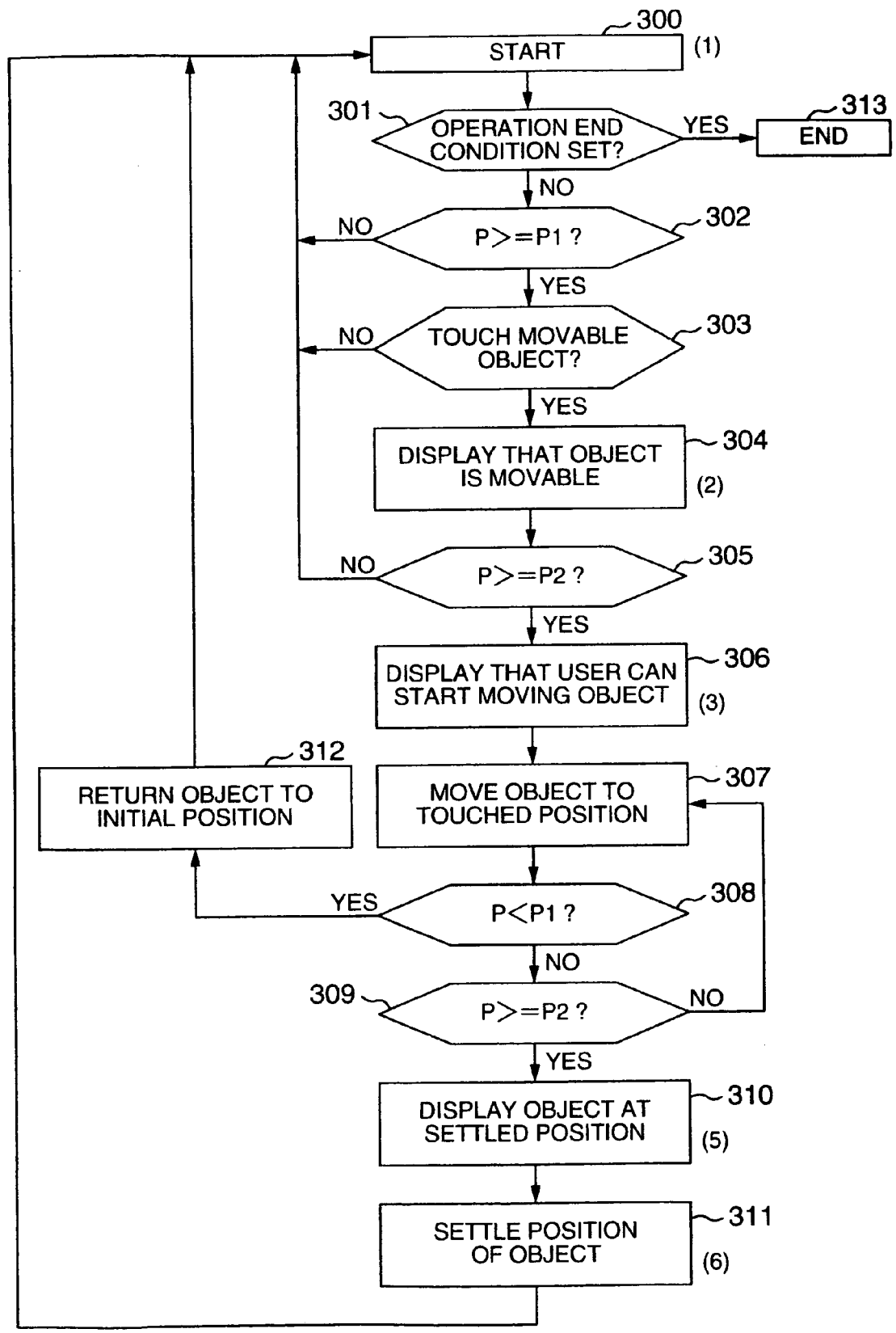
FIG. 15 is a flow chart illustrating a third specific example of the function control performed by the control unit in FIG. 5.

FIG. 15 is a flow chart illustrating a third specific example of the function control performed by the control unit 17 in FIG. 5. Like the foregoing first and second specific examples, the function control in the third specific example also provides a function of dragging and dropping an object such as an icon displayed on the display screen 2.

Figure 16:
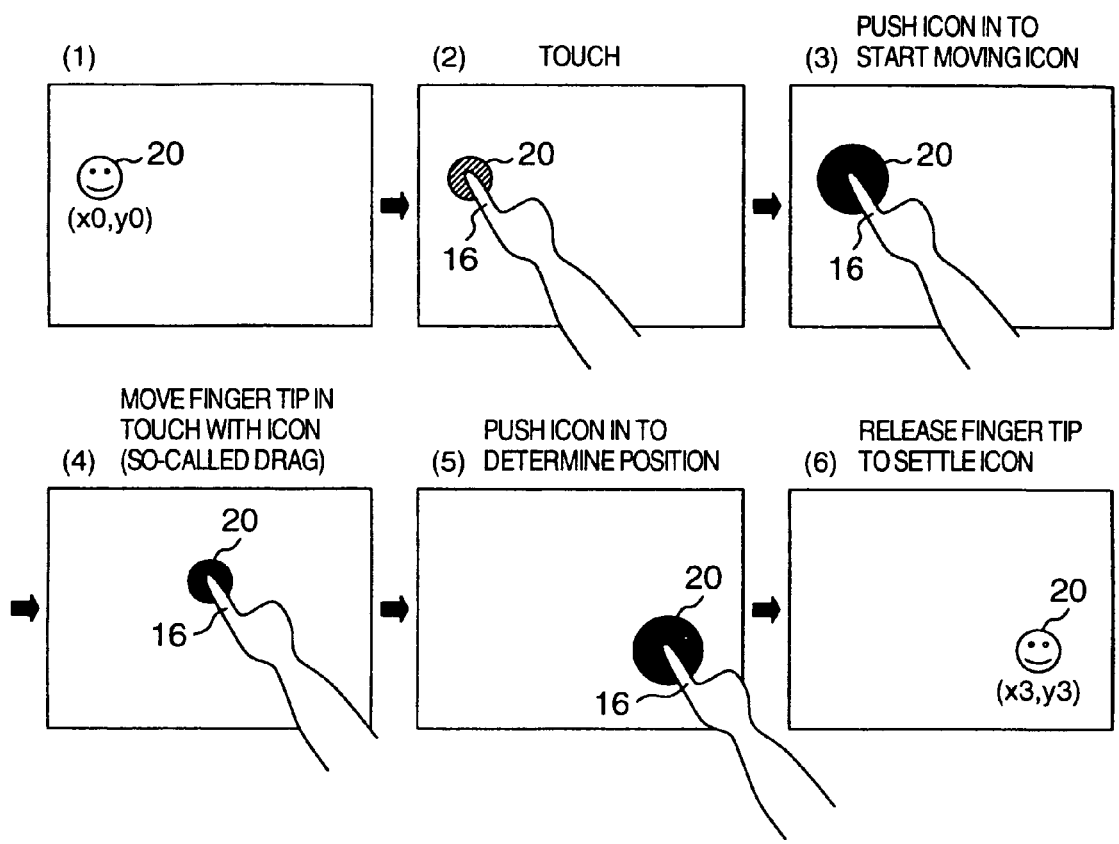
FIG. 16 is a diagram illustrating a specific example of images displayed on the display screen in FIG. 1 in the process of the control operation illustrated in FIG. 15.

FIG. 16 in turn illustrates images displayed on the display screen 2 in the process of the function control performed by the control unit 17 in the third specific example. Parts corresponding to those in FIG. 12 are designated the same reference numerals.

Figure 17:
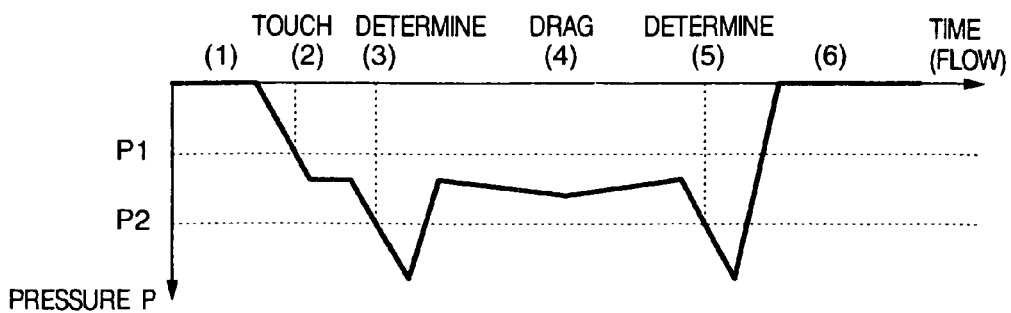
FIG. 17 is a diagram showing a specific example of a change in pressure produced by a finger tip for executing the control operation illustrated in FIG. 15.

FIG. 17 further shows a change in the pushing force P for executing the operation in the third specific example of the function control. Specifically, FIG. 17 denotes sequential numbers (1)–(6) corresponding to the images in FIG. 16 along a time axis.

Referring first to FIG. 15, steps 300–302 and 313 are similar to steps 100–102 and 113 in FIG. 7, wherein the finger tip 16 is not in touch with the touch panel 9, and a image (1) illustrated in FIG. 16 is displayed on the display screen 2. In the image (1), assume that an icon 20 is displayed at a position (x0, y0) on the display screen 2.

As the user brings the finger tip 16 into touch with the position at which the icon 20 is displayed on the image (1) appearing on the display screen 2, the pressure sensor senses a pushing force P equal to or larger than P1 (P1<=P), as shown in FIG. 17 (step 302). In response, the control unit 17 (FIG. 5) determines whether or not the position at which the screen display 2 is touched by the finger tip 16 falls within the area of the icon 20 in a manner similar to the aforementioned specific examples. When within the area, the control unit 17 determines that the user has touched the touch panel 9 at the position within the area of the movable icon 20 (step 303), and displays a image (2) on the display screen 2 for indicating that the icon 20 is movable, as illustrated in FIG. 16 (step 304). For indicating that the icon 20 is movable, the icon 20 may be changed, for example, in color, vibrated, or the like.

Next, as the user pushes the icon 20 in with the finger tip 16 held in touch with the icon 20, the pressure sensor senses the pushing force P equal to or larger than P2 (P2<=P), as shown in FIG. 17 (step 305). In response, the control unit 17 displays a image (3) on the display screen 2 for indicating that the user can start moving the icon 20, as illustrated in FIG. 16 (step 306). For indicating that the user can start moving the icon 20, for example, the icon 20 may be further changed in color, size and the like. Here, the icon 20 is shown as changed in size and color.

Though not shown, when the user releases the finger tip 16 from the touch panel 9 with the image (3) displayed on the display screen 2 (step 306) so that the pushing force P is reduced to less than P1, this results in a selection of a function associated with the icon 20, causing the control unit 17 to determine and activate the selected function.

However, when the user reduces the pushing force P applied by the finger tip 16 on the image (4) to satisfy P1<=P<P2 shown in FIG. 17, and moves the finger tip 16 present within the area of the icon 20, the icon 20 is dragged following the moving finger tip 16. The image (4) in FIG. 16 is displayed on the display screen 2 in this event, wherein the icon 20 is reduced in size from that displayed on the image (3) (step 307). In this event, when the user releases the finger tip 16 from the touch panel 9 in the middle of the movement so that the pushing force P becomes smaller than P1, the dragging operation is interrupted, the icon 20 automatically returns to the initial position (x0, y0) (step 312), and the initial image (1) illustrated in FIG. 16 is displayed on the display screen (step 300).

Assume that the user continues to drag the icon 20 (steps 307–309), then moves the icon 20 to a predetermined position (x3, y3), and pushes the icon 20 in with the finger tip 16 which applies the pushing force P increased to P2 or larger (P>=P2), as shown in FIG. 17 (step 309). In response, the control unit 17 displays a image (5) in which the icon 20 is displayed, for example, in the same state as in the image (3), as illustrated in FIG. 16. The icon 20 is settled at this predetermined position (x3, y3) (step 310). Then, as the user releases the finger tip 16 from the touch panel 9 so that the pushing force P becomes smaller than P1 (P<P1) as shown in FIG. 17, the control unit 17 displays a image (6) on the display screen 2, wherein the icon 20 is settled at the position (x3, y3) as originally displayed (step 311). Subsequently, the flow returns to step 300. In this manner, in the third specific example, a movable object such as an icon displayed on the screen can be moved to a predetermined position likewise through a simple touch operation.

The foregoing embodiment is suitable when a plurality of operators share the same terminal since no operator will inadvertently move the icon 20 (erroneously touches and moves the icon 20). Also, since the operator is required to push the icon 20 in for determining a movement of the icon, the foregoing embodiment can reduce erroneous operations which could result in erroneous determination of destination. Particularly, when the destination has a different meaning and/or a value depending on the position (for example, "transmission tray," "dust box" and the like), such erroneous operations can be reduced because the destination of the icon 20 is determined after the operator intentionally pushes the icon 20 in.

In this embodiment, the drag-and-drop operation may be used likewise in combination with a push-in operation for activating a function associated with the icon 20 with an operation similar to that in the aforementioned embodiment.

When a plurality of icons having different types of functions are displayed on the display screen 2, these icons may be dragged and dropped in such a manner that any of the aforementioned first to third methods is assigned to each type of function associated with an icon, so that a different drag-and-drop operation may be used for each type of function. Of course, the drag-and-drop operation may be disabled for an icon which has a particular function.

Figure 18:
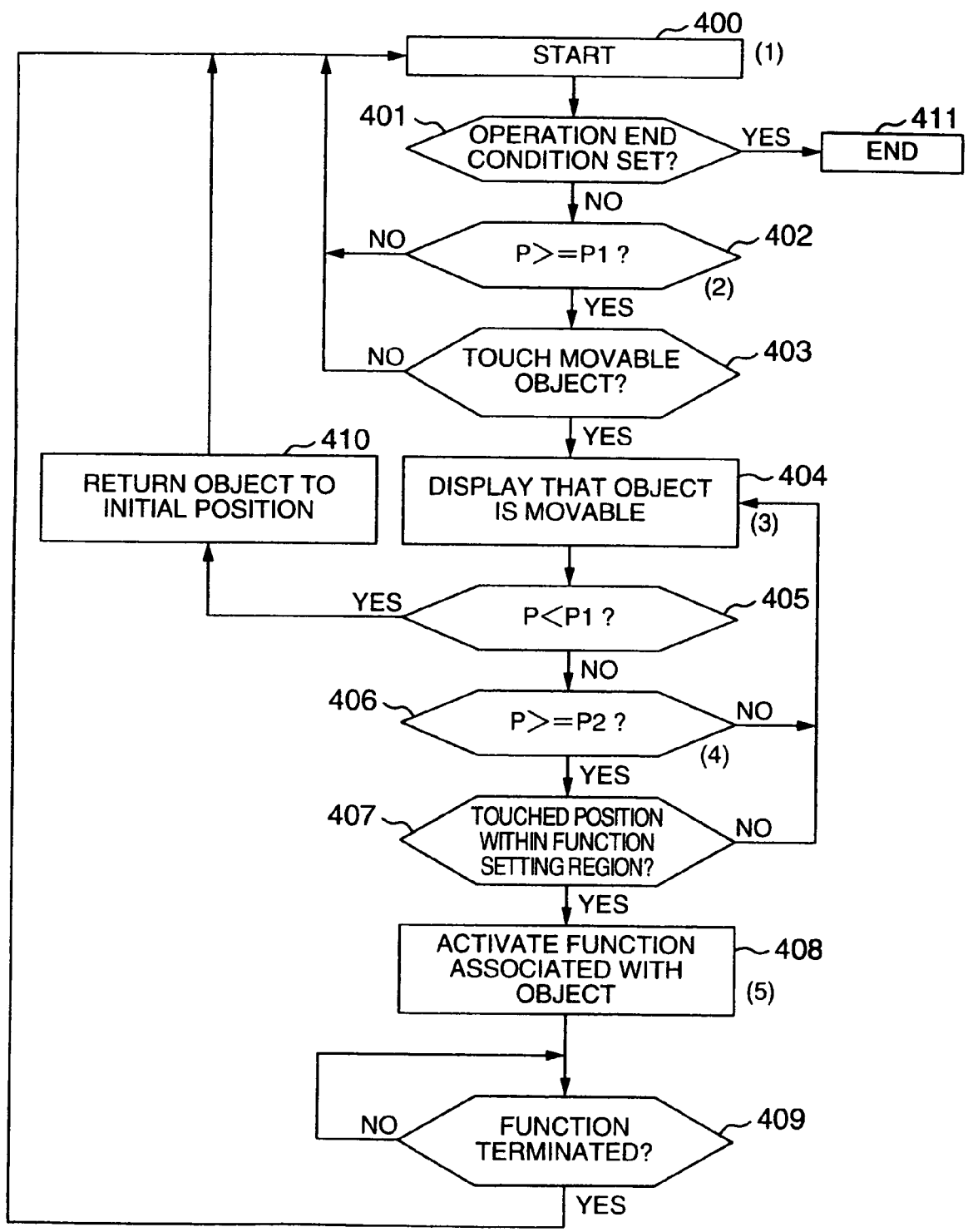
FIG. 18 is a flow chart illustrating a fourth specific example of the function control performed by the control unit in FIG. 5.

FIG. 18 is a flow chart illustrating a fourth specific example of the function control performed by the control unit 17 in FIG. 5. In this specific example, an object such as an icon representative of an item is displayed on the display screen 2 as a touch-driven member which supports the drag-and-drop operation and has a processing function such as a purchase of a desired item. Therefore, the function provided in the fourth specific example may be referred to as a drag and function selection. In the fourth specific example, the display unit is provided with functions generally available in a digital content delivery terminal.

Figure 19:
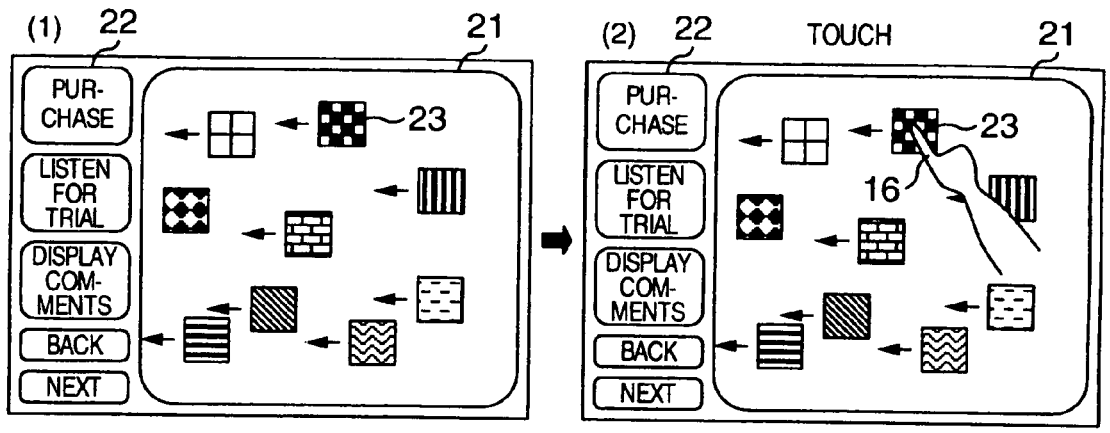
FIG. 19 is a diagram illustrating a specific example of images displayed on the display screen in FIG. 1 in the process of the control operation illustrated in FIG. 18.
Figure 19:
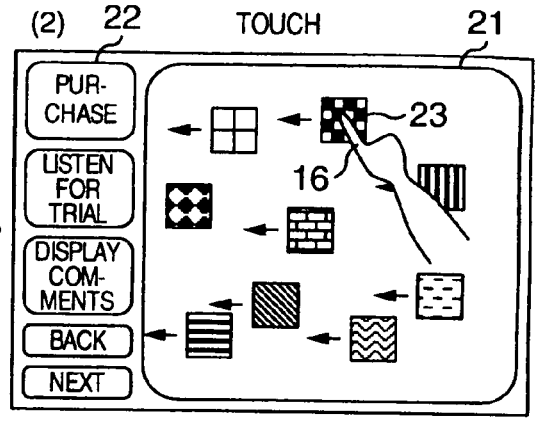
Figure 19:
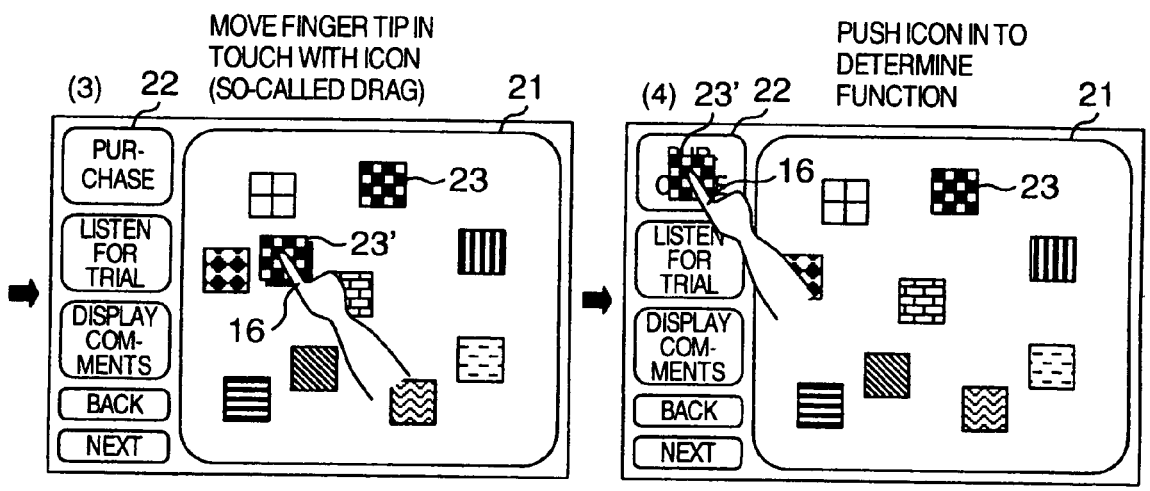
Figure 19:
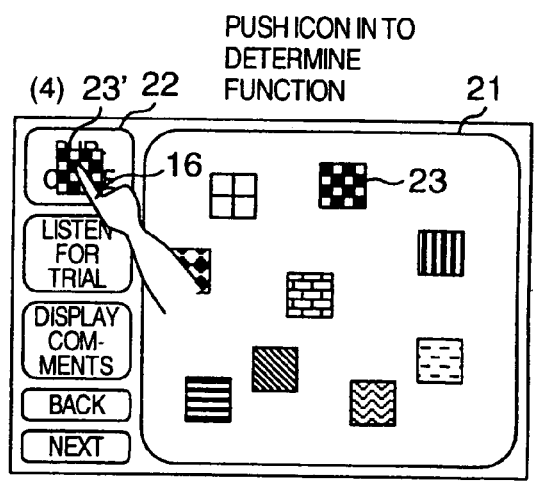
Figure 19:
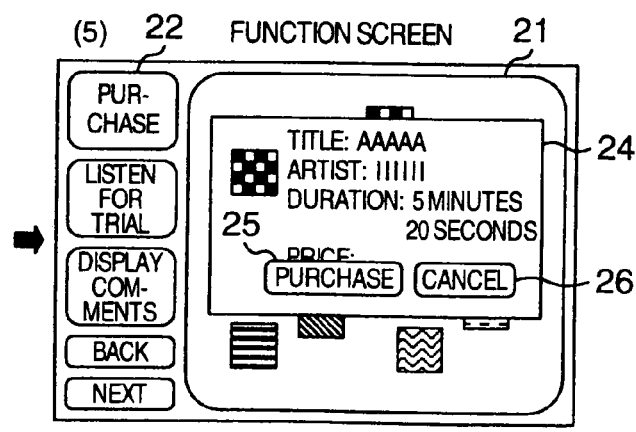

FIG. 19 in turn illustrates images displayed on the display screen 2 in the process of the function control performed by the control unit 17 in the fourth specific example. The images include an object display region 21; a function setting region 22; objects 23, 23' (which are icons representative of items in this example, but not limited thereto); a guidance 24; a "PURCHASE" button 25; and a "CANCEL" button 26.

Figure 20:
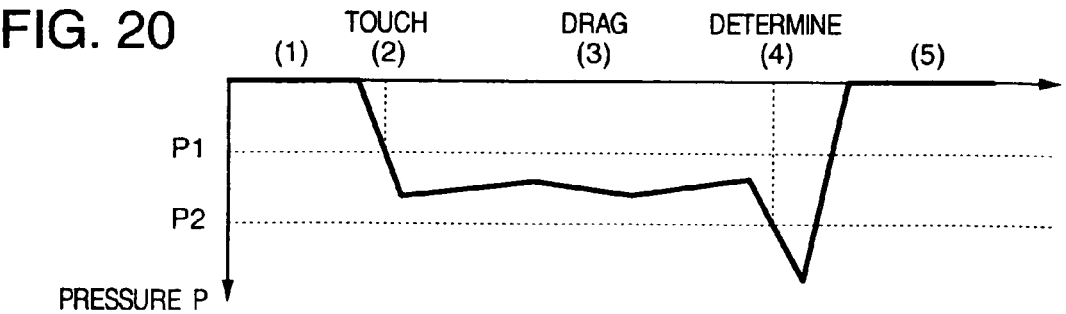
FIG. 20 is a diagram showing a specific example of a change in pressure produced by a finger tip for executing the control operation illustrated in FIG. 18.

FIG. 20 further shows a change in the pushing force P for executing the operation in the fourth specific example of the function control. Specifically, FIG. 20 denotes sequential numbers (1)–(5) corresponding to the images in FIG. 19 along a time axis.

Referring first to FIG. 18, steps 400–402 and 411 are similar to steps 100–102 and 113 in FIG. 7, wherein the finger tip 16 is not in touch with the touch panel 9, and a image (1) illustrated in FIG. 19 is displayed on the display screen 2. The image (1) includes an icon (object) display region 21 for displaying icons 23 indicative of a variety of items and capable of activating functions associated with items set in a function setting region 22; and the function setting region 22 for indicating a menu of modes for activating functions such as "PURCHASE," "LISTEN FOR TRIAL," "DISPLAY COMMENTS," and the like, when the items are, for example, music contents. It should be noted that these are merely exemplary items, and the present invention is not limited to those mentioned above. Also, a different function menu may be displayed depending on the type of items.

As the user brings the finger tip 16 into touch with the position at which the icon 23 associated with a desired item is displayed on the image (1) appearing on the display screen 2, the pressure sensor senses a pushing force P smaller than P2 and equal to or larger than P1 (P2>P>=P1), as shown in FIG. 20 (step 402). In response, the control unit 17 (FIG. 5) determines whether or not the position at which the screen display 2 is pushed in by the finger tip 16 falls within the area of the icon 23 in a manner similar to the aforementioned specific examples. When within the area, the control unit 17 determines that the user has touched at the position within the area of the movable icon 23 (step 403), and displays a image (2) on the display screen 2 for indicating that the icon 23 is movable, as illustrated in FIG. 19. For indicating that the icon 23 is movable, the icon 23 may be changed, for example, in color, vibrated, or the like.

Next, as shown in FIG. 20, the user moves the finger tip 16 with the pushing force P maintained to be P2>P>=P1, a shadow icon 23' having the same appearance is produced from the icon 23, and is dragged following the moving finger tip 16 (step 404). A image (3) in FIG. 19 indicates an image displayed on the display screen 2 in this event, wherein the icon 23' moves together with the finger tip 16.

As the user releases the finger tip 16 from the touch panel 9 in the middle of the movement so that the pushing force becomes smaller than P1 (step 405), the dragging operation is interrupted, and the icon 23' disappears (or automatically returns to the position of the icon 23 in the icon display region 21 and lies on the icon 23) (step 410). Consequently, the initial image (1) illustrated in FIG. 19 is displayed on the display screen 2 (step 400).

Also, as illustrated in FIG. 20, the user moves the finger tip 16 without releasing from the touch panel 9 with the pushing force P equal to or larger than P2 and smaller than P2 (P1<=P<P2) to continuously drag the icon 23' (steps 404–406), and then drops the icon 23' on a desired function in the menu displayed in the function setting region 22, for example, a function "PURCHASE" when the user wishes to purchase the item (step 407). In response, the control unit 17 displays a image (4) illustrated in FIG. 19 on the display screen 2. Next, as the user pushes the touch panel 9 in with the finger tip 16 remaining in touch with the icon 23' so that the pushing force P becomes equal to or larger than P2 (P>=P2) as shown in FIG. 20 (step 407), the control unit 17 displays a image (5) on the display-screen 2 for showing a detailed guidance 24 on the item associated with the icon 23' as illustrated in FIG. 19 (step 408). Thus, the guidance 24 displayed in this way can reduce erroneous operations of the user even if the user erroneously selects an unintended function from the menu.

For purchasing the item, the user may touch a "PURCHASE" button 25 in the guidance 24, permitting the user to purchase the item through downloading. On the other hand, as the user touches a "CANCEL" button 26, the user can cancel the purchase. After completion of such processing (step 409), the flow returns to step 400, wherein the initial image (1) illustrated in FIG. 19 is displayed on the display screen 2. As described above, when the operations on a plurality of functional buttons are associated to activate a single function, as is the case of requiring the delivery of a content, the display unit in this specific example eliminates from the user the need for confirming a sequence of touch operations on the plurality of touch-driven members, and permits the user to activate the function through a simple touch operation. In addition, the display unit in this specific example can ensure that the user receives a delivered content while preventing the user from erroneously selecting an unintended function.

Particularly, in the foregoing embodiment, when the user touches the icon (touch-driven member) with a pushing force P equal to or larger than P1 and smaller than P2 (P1<=P<P2), the user can drag the icon following a movement of the finger tip (indicating means) (first processing). In addition, the user can activate the process previously assigned to the icon in combination with a region (a desired function in the menu) to which the user drags the icon (second processing).

In the foregoing embodiment, when the user pushes an object 23 in within the object display region 21, a function associated with the object 23 may be activated. For example, in this embodiment, the user may be allowed to "listen to a content for trail."

Figure 21:
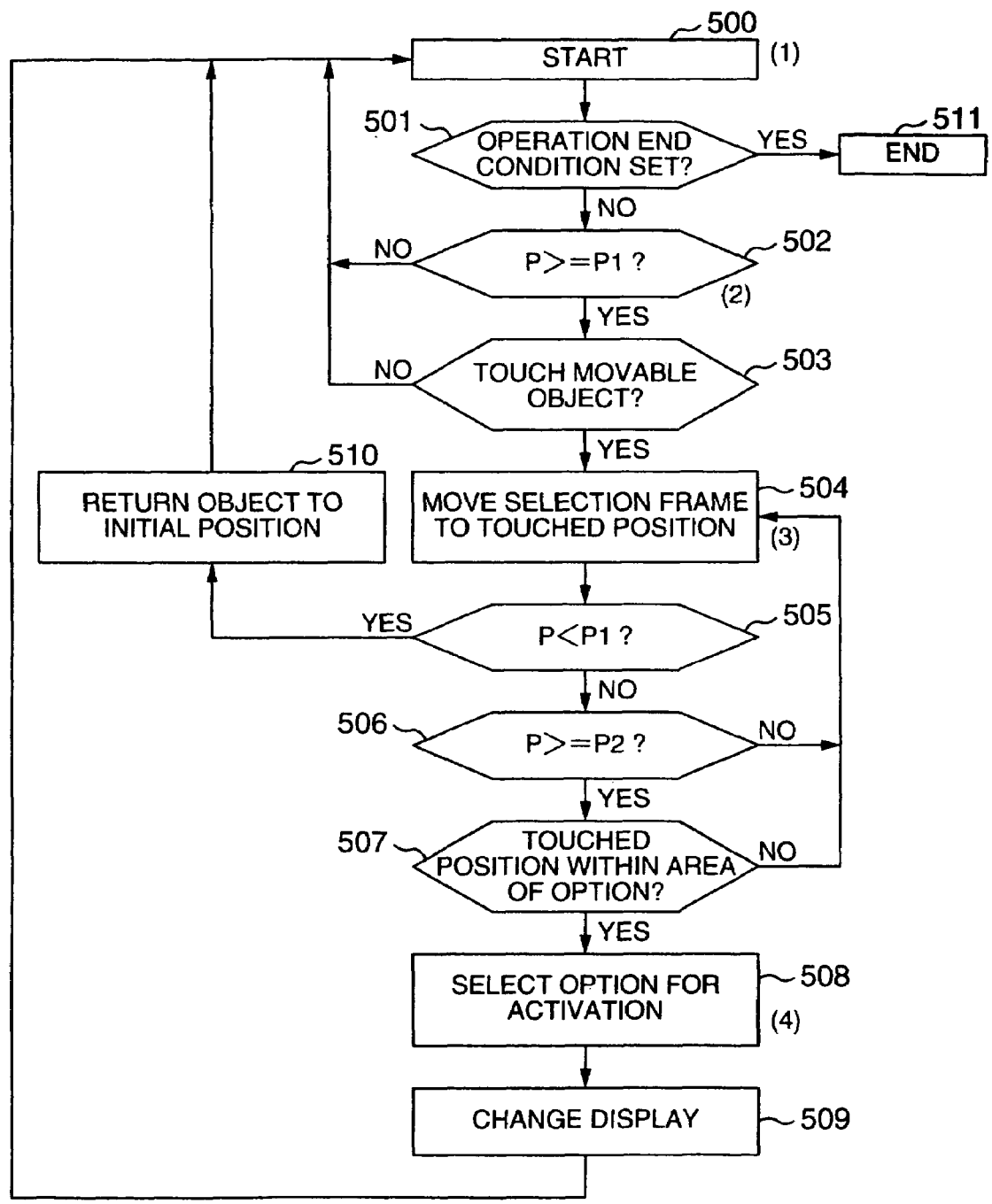
FIG. 21 is a flow chart illustrating a fifth specific example of the function control performed by the control unit in FIG. 5.

FIG. 21 is a flow chart illustrating a fifth specific example of the function control performed by the control unit 17 in FIG. 5. In this fifth specific example, the display unit provides a function of selecting an item from a pop-up menu.

Figure 22:
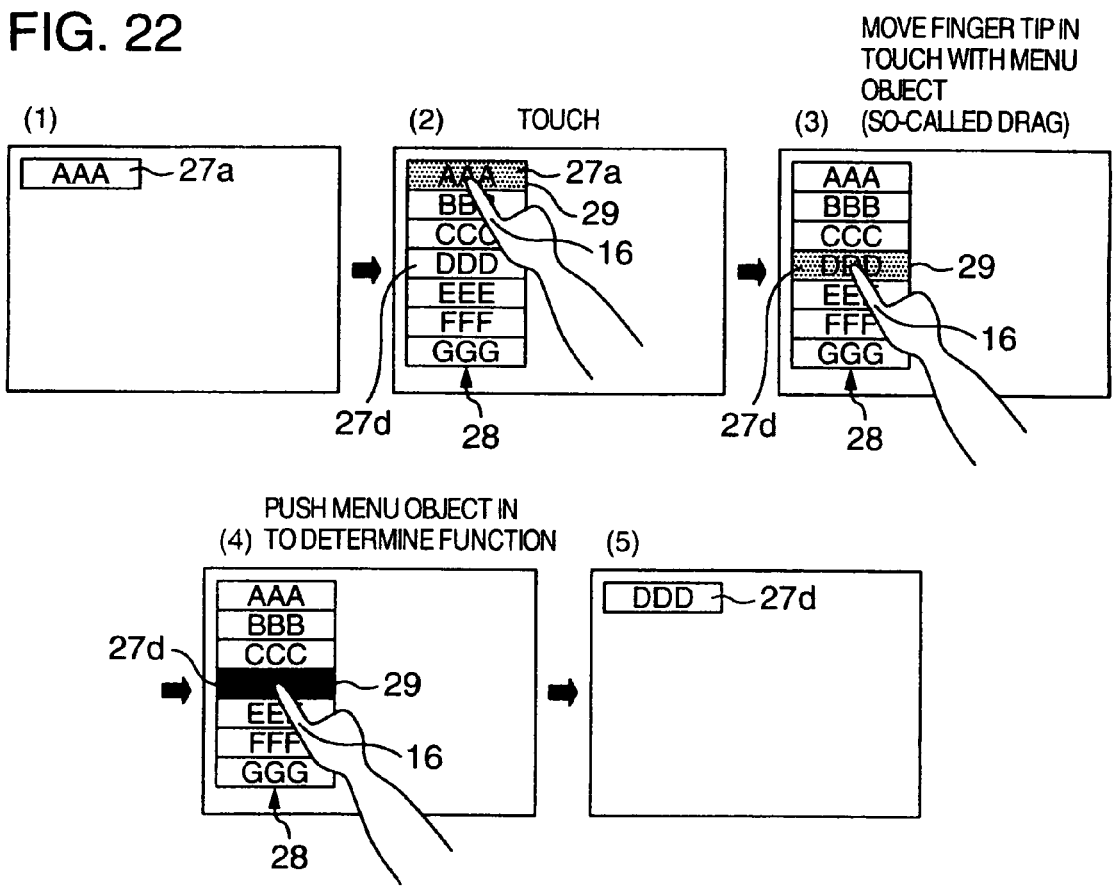
FIG. 22 is a diagram illustrating a specific example of images displayed on the display screen in FIG. 1 in the process of a control operation illustrated in FIG. 21.

FIG. 22 in turn illustrates images displayed on the display screen 2 in the process of the function control performed by the control unit 17 in the fifth specific example. The images include menu objects 27; a pop-up menu 28; and a selection frame (cursor) 29.

Figure 23:
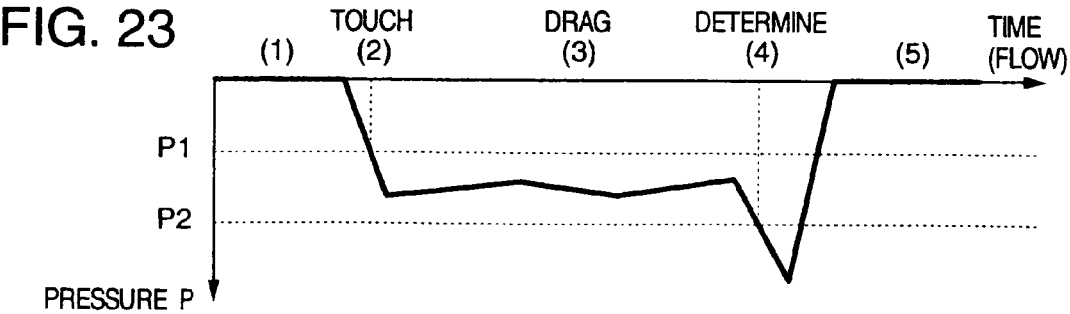
FIG. 23 is a diagram showing a specific example of a change in pressure produced by a finger tip for executing the control operation illustrated in FIG. 21.

FIG. 23 further shows a change in the pushing force P for executing the operation in the fifth specific example of the function control. Specifically, FIG. 23 denotes sequential numbers (1)–(5) corresponding to the images in FIG. 22 along a time axis.

Referring first to FIG. 21, steps 500–502 and 511 are similar to steps 100–102 and 113 in FIG. 7, wherein the finger tip 16 is not in touch with the touch panel 9, and a image (1) illustrated in FIG. 19 is displayed on the display screen 2. The menu objects 27 are displayed on the image (1).

For changing one menu object to another on the image (1), the user may touch a currently displayed menu object 27a with a finger tip 16. As the control unit 17 responsively senses a pushing force smaller than P2 and equal to or larger than P1 (P2>P>=P1), as shown in FIG. 23 (step 502), the control unit 17 determines whether or not the position at which the finger tip 16 touches the touch panel 9 falls within the area of the menu object 27a in a manner similar to the aforementioned specific examples. When within the area, the control unit 17 determines that the touched position is included in the area of the movable menu object 27a (step 503), and displays a image (2) illustrated in FIG. 22 on the display screen 2. On the image (2), the pop-up menu 28 comprising other menu objects arranged therein is displayed together with the menu object 27a so far displayed thereon. One of the menu objects within the pop-up menu 28, the menu object 27a so far displayed and touched by the finger tip 16 in this event, is displayed as selected by the selection frame 29 at the previous position.

As the user moves the finger tip 16, which is in touch with the menu object 27a as described above, within the pop-up menu 28 in a direction in which the menu objects are arranged, the selection frame 29 is also moved (dragged) together with the finger tip 16. A image (3) illustrated in FIG. 22 shows an image displayed on the display screen 2 in this event (step 504). As long as the user is moving the finger tip 16 with the pushing force P maintained equal to or larger than P1 and smaller than P2 (P1<=P<P2), the operations at steps 505–507 are repeated to drag the selection frame 29 following the finger tip 16. As the user releases the finger tip 16 from the touch panel 9 during this operation so that the pushing force P becomes smaller than P1 (step 505), the dragging operation is interrupted, the menu object 27a returns to the initial position (step 510), and the initial image (1) illustrated in FIG. 22 is displayed on the display screen 2 (step 500).

As shown in FIG. 23, the user moves the finger tip 16 without releasing from the touch panel 9 with the pushing force P equal to or larger than P1 and smaller than P2 (P1<=P<P2), causing the selection frame 29 to reach the position of a desired menu object 27d (within an option region) in the pop-up menu 28 (step 507). Then, the user pushes the touch panel 9 in without releasing the finger tip 16 from the selection frame 29, so that the pushing force P becomes equal to or larger than P2 (P>=P2), as illustrated in FIG. 23, resulting in a selection of the desired menu object 27d (step 508). A image (4) illustrated in FIG. 22 shows an image displayed on the display screen 2 in this event, wherein the selection frame 29 is changed in color to indicate the selection. Then, the image (4) is switched to a image (5) in FIG. 22, wherein the selected menu object 27d is displayed at the same position of the former menu object 27a in place of the menu object 27a (step 509), followed by the flow returning to step 500 for waiting for the next operation.

As described above, in the fifth specific example, the user can select an object from a pop-up menu through a simple touch operation. Particularly, in a pop-up menu, a pop-up menu is often opened to show selective options (functions) for the user to select a desired function. In this embodiment, such showing can be made through quite simple operations consisting of "touching with a finger," "confirming," and "releasing the finger." When the user eventually attempts to activate the selected option, the user pushes the option in with a large pushing force, thereby reducing erroneous operations such as inadvertent activation of a different option not intended by the user, possibly caused by the finger unintentionally moving off the touch panel.

While the foregoing embodiment has been described in connection with a single pop-up menu, a plurality of pop-up menus may be displayed simultaneously on the display screen, in which case similar advantages can be provided.

As described above, the display unit with a touch panel according to the present invention comprises sensing means for sensing a pushing force P applied by a finger tip or the like, and a control unit which performs first processing when the pushing force P is equal to or larger than P1 and smaller than P2 (P1<=P<P2), and performing second processing when the pushing force changes from a value equal to or larger than P1 and smaller than P2 (P1<=P<P2) to a value equal to or larger than P2 (P2<=P). The first processing includes moving a touch-driven member following the finger tip as it moves, and the second processing includes activating a function associated with the touch-driven member touched by the finger tip. Thus, the display unit permits the user to perform an operation for moving a touch-driven member such as a drag-and-drop operation through a touch operation with a finger tip. Accordingly, the user can readily carry out relocation of a touch-driven member on the display screen, and the like through a touch operation without fail. When a single function is activated in association with operations on a touch-driven member, the display unit of the present invention can eliminate the need for confirming a sequence of touch operations on the touch-driven member, simplify the operation, and reduce erroneous operations.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A display unit having a display panel, and a touch panel disposed on a display surface of the display panel for detecting a position touched by indicating means, said touch panel permitting an operator to touch a touch-driven member displayed on said display surface to handle said touch-driven member, said display unit comprising:

sensing means for sensing a pushing force P produced by said indicating means when said indicating means touches said touch-driven member; and a control unit for performing first processing associated with said touch-driven member pushed by the indicating means when the pushing force P detected by said sensing means is equal to or larger than a first set pressure P1 and smaller than a second set pressure P2 (P1≦P<P2), said second set pressure P2 being larger than said first set pressure P1, and for performing second processing associated with said touch-driven member pushed by said indicating means when the pushing force P is equal to or larger than the second set pressure P2 (P2≦P), wherein said first processing includes dragging said touch-driven member following said indicating means pursuant to a movement of said indicating means, and said second processing includes activating a processing previously assigned to said touch-driven member in combination with a function associated with a region of said display surface to which said touch-driven member has been dragged, wherein said display panel and said touch panel are placed within a housing, said housing supporting said display panel with a first supporting member, and said display panel supporting said touch panel with a second supporting member, and wherein said sensing means for sensing said pushing force P is placed in said touch panel.

2. A display unit having a display panel, and a touch panel disposed on a display surface of the display panel for detecting a position touched by indicating means, said touch panel permitting an operator to touch a touch-driven member displayed on said display surface to handle said touch-driven member, said display unit comprising:

sensing means for sensing a pushing force P produced by said indicating means when said indicating means touches said touch-driven member; and a control unit for performing first processing associated with said touch-driven member pushed by the indicating means when the pushing force P detected by said sensing means is equal to or larger than a first set pressure P1 and smaller than a second set pressure P2 ($P1 \leq P < P2$), said second set pressure P2 being larger than said first set pressure P1, and for performing second processing associated with said touch-driven member pushed by said indicating means when the pushing force P is equal to or larger than the second set pressure P2 ($P2 \leq P$), wherein said first processing includes dragging said touch-driven member following said indicating means pursuant to a movement of said indicating means, and said second processing includes activating a processing previously assigned to said touch-driven member in combination with a function associated with a region of said display surface to which said touch-driven member has been dragged, wherein said display panel and said touch panel are placed within a housing, said housing supporting said display panel with a first supporting member, and said display panel supporting said touch panel with a second supporting member, and wherein said sensing means for sensing said pushing force P is placed in said second supporting member.

3. A display unit having a display panel, and a touch panel disposed on a display surface of the display panel for detecting a position touched by indicating means, said touch panel permitting an operator to touch a touch-driven member displayed on said display surface to handle said touch-driven member, said display unit comprising:

sensing means for sensing a pushing force P produced by said indicating means when said indicating means touches said touch-driven member; and a control unit for performing first processing associated with said touch-driven member pushed by the indicating means when the pushing force P detected by said sensing means is equal to or larger than a first set pressure P1 and smaller than a second set pressure P2 ($P1<=P<P2$), said second set pressure P2 being larger than said first set pressure P1, and for performing second processing associated with said touch-driven member pushed by said indicating means when the pushing force P is equal to or larger than the second set pressure P2 ($P2<=P$), wherein said first processing includes dragging said touch-driven member following said indicating means pursuant to a movement of said indicating means, and said second processing includes movement of said touch-driven member, wherein said second processing proceeds to permit for said touch-driven member to move when said sensing means senses said pushing force P being from $P<P1$ through $P1 \leq P < P2$ to $P2 \leq P$, thereafter wherein said first processing proceeds for said touch-driven member to drag when said sensing means senses said pushing force P being from $P2 \leq P$ to $P1 \leq P < P2$, and wherein, when it is detected that said pushing force P changes in a predetermined time from $P<P1$ to $P2 \leq P$ or from $P2 \leq P$ to $P<P1$, a predetermined processing for said touch-driven member is made without executing said dragging or movement for said touch-driven member.

* * * * *